United States Patent
Wen et al.

(10) Patent No.: US 12,535,925 B2
(45) Date of Patent: Jan. 27, 2026

(54) TOUCH CONTROL STRUCTURE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Ping Wen, Beijing (CN); Wei Wang, Beijing (CN); Shun Zhang, Beijing (CN); Yuanqi Zhang, Beijing (CN); Chang Luo, Beijing (CN); Yang Zeng, Beijing (CN); Yu Wang, Beijing (CN); Yi Zhang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/941,448

(22) Filed: Nov. 8, 2024

(65) Prior Publication Data
US 2025/0068287 A1 Feb. 27, 2025

Related U.S. Application Data

(63) Continuation of application No. 18/360,241, filed on Jul. 27, 2023, now Pat. No. 12,204,727, which is a continuation of application No. 17/599,714, filed as application No. PCT/CN2020/138674 on Dec. 23, 2020, now Pat. No. 11,755,161.

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05)

(58) Field of Classification Search
None
See application file for complete search history.

(56) References Cited

U.S. PATENT DOCUMENTS

| | | | | |
|---|---|---|---|---|
| 2011/0298824 A1* | 12/2011 | Lee | .................. | A63F 13/327 345/633 |
| 2016/0011633 A1* | 1/2016 | Watanabe | ............. | G02F 1/1333 345/184 |
| 2019/0064960 A1* | 2/2019 | Na | .................. | H10K 59/40 |

(Continued)

*Primary Examiner* — Duane N Taylor, Jr.
(74) *Attorney, Agent, or Firm* — Intellectual Valley Law, P.C.

(57) ABSTRACT

A display panel includes a plurality of light emitting elements; an encapsulating layer on the plurality of light emitting elements; and a touch control structure on the encapsulating layer. The touch control structure includes a plurality of first mesh electrodes along a row direction and a plurality of second mesh electrodes along a column direction. The touch control structure is limited in a touch control region and absent in a window region surrounded by the touch control region. The plurality of second mesh electrodes includes a first mesh block and a second mesh block respectively on a first side and a second side of the window region; and a first conductive bridge connecting the first mesh block and the second mesh block. The first conductive bridge comprises a first segment and a second segment. The second segment is in a layer different from the first segment.

20 Claims, 19 Drawing Sheets

(56) References Cited

U.S. PATENT DOCUMENTS

| | | | |
|---|---|---|---|
| 2020/0064968 A1* | 2/2020 | Kim | H10K 59/8792 |
| 2021/0036064 A1* | 2/2021 | Jang | H10K 59/121 |
| 2021/0397320 A1* | 12/2021 | Ye | G06F 3/0448 |

* cited by examiner

TOUCH CONTROL STRUCTURE AND DISPLAY APPARATUS

CROSS-REFERENCE TO RELATED APPLICATION

This application is a continuation of U.S. application Ser. No. 18/360,241, filed Jul. 27, 2023, which is a continuation of U.S. application Ser. No. 17/599,714, filed Dec. 23, 2020, which is a national stage application under 35 U.S.C. § 371 of International Application No. PCT/CN2020/138674, filed Dec. 23, 2020. Each of the forgoing applications is herein incorporated by reference in its entirety for all purposes.

TECHNICAL FIELD

The present invention relates to the field of display technology, more particularly, to a touch control structure and a display apparatus.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a display panel, comprising a plurality of light emitting elements; an encapsulating layer on the plurality of light emitting elements; and a touch control structure on the encapsulating layer; wherein the touch control structure comprises a plurality of first mesh electrodes along a row direction and a plurality of second mesh electrodes along a column direction; wherein the touch control structure is limited in a touch control region and absent in a window region surrounded by the touch control region; wherein the plurality of second mesh electrodes comprises a first mesh block and a second mesh block respectively on a first side and a second side of the window region; and a first conductive bridge connecting the first mesh block and the second mesh block; wherein the first conductive bridge comprises a first segment and a second segment; and the second segment is in a layer different from the first segment; wherein the window region is a region in the display panel having a hole configured for installing an accessory; and the plurality of light emitting elements are absent in a window region.

Optionally, the plurality of second mesh electrodes further comprises a first conductive plate connected to one or more mesh lines of the first mesh block; and a second conductive plate connected to one or more mesh lines of the second mesh block; wherein the first conductive bridge connects the first conductive plate and the second conductive plate; and the second segment is in a layer different from the first conductive plate and the second conductive plate.

Optionally, the plurality of first mesh electrodes comprises a third mesh block on a third side of the window region; and a third conductive plate connected to one or more mesh lines of the third mesh block; wherein the third conductive plate spaces apart the first conductive bridge from the third mesh block; the third conductive plate comprises a first part and a second part; the second segment is in a layer different from the third conductive plate; the first segment and the second segment are respectively around a first portion and a second portion of a periphery of the window region; the first part and the second part are respectively around a third portion and a fourth portion of the periphery of the window region; the first portion is at least partially overlapping with the third portion; and the second portion is at least partially overlapping with the fourth portion.

Optionally, the first part has a first shortest plate width along a direction from the first part to the window region; the second part has a second shortest plate width along a direction from the second part to the window region; and the first shortest plate width is less than the second shortest plate width.

Optionally, the plurality of second mesh electrodes further comprises a first conductive plate connected to one or more mesh lines of the first mesh block; and a second conductive plate connected to one or more mesh lines of the second mesh block; wherein the first conductive bridge further comprises a fifth segment in a same layer as the first segment, the first conductive plate, and the second conductive plate; wherein an orthographic projection of a first overlapping portion of the fifth segment on a base substrate at least partially overlaps with an orthographic projection of a second overlapping portion of the second segment on the base substrate, the first overlapping portion connecting to the second overlapping portion through a via extending through a touch insulating layer; the first overlapping portion and the second overlapping portion are around a partially overlapping portion of the periphery of the window region; the second part is spaced apart from a third dummy plate adjacent to the second part by a gap around a gap portion of the periphery of the window region; and the partially overlapping portion comprises the gap portion.

Optionally, the third conductive plate further comprises a third part, the first part between the second part and the third part; wherein the plurality of second mesh electrodes further comprises a first conductive plate connected to one or more mesh lines of the first mesh block; and a second conductive plate connected to one or more mesh lines of the second mesh block; wherein the first conductive bridge further comprises a third segment, the first segment between the second segment and the third segment; wherein the third segment is in a same layer as the second segment, and is in a layer different from the first segment, the first conductive plate, the second conductive plate, and the third conductive plate; the third segment is around a fifth portion of the periphery of the window region; the third part is around a sixth portion of the periphery of the window region; and the fifth portion is at least partially overlapping with the sixth portion.

Optionally, the first part has a first shortest plate width along a direction from the first part to the window region; the second part has a second shortest plate width along a direction from the second part to the window region; the third part has a third shortest plate width along a direction from the third part to the window region; and the first shortest plate width is less than the second shortest plate width, and is less than the third shortest plate width.

Optionally, the display panel further comprises a first dummy plate insulated from the first conductive bridge and the third conductive plate, and spacing part a portion of the first conductive bridge and a portion of the third conductive plate; the first dummy plate is around a seventh portion of the periphery of the window region; and the seventh portion is at least partially overlapping with the third portion, and is non-overlapping with the fourth portion and the sixth portion.

Optionally, in an orthographic projection of the touch control structure on a base substrate, an orthographic projection of a conductive component on the base substrate is absent in a space between an orthographic projection of the second segment on the base substrate and an orthographic projection of the second part on the base substrate.

Optionally, in an orthographic projection of the touch control structure on a base substrate, an orthographic projection of a conductive component on the base substrate is absent in a space between an orthographic projection of the second segment on the base substrate and an orthographic projection of the second part on the base substrate; and in the orthographic projection of the touch control structure on the base substrate, an orthographic projection of a conductive component on the base substrate is absent in a space between an orthographic projection of the third segment on the base substrate and an orthographic projection of the third part on the base substrate.

Optionally, in an orthographic projection of the touch control structure on a base substrate, an orthographic projection of a conductive component on the base substrate is absent in a space between an orthographic projection of the second segment on the base substrate and an orthographic projection of the second part on the base substrate; in the orthographic projection of the touch control structure on the base substrate, an orthographic projection of a conductive component on the base substrate is absent in a space between an orthographic projection of the third segment on the base substrate and an orthographic projection of the third part on the base substrate; and in the orthographic projection of the touch control structure on the base substrate, an orthographic projection of the first dummy plate on the base substrate is in a space between an orthographic projection of the first segment on the base substrate and an orthographic projection of the first part on the base substrate.

Optionally, the plurality of first mesh electrodes comprises a fourth mesh block and a fifth mesh block respectively on a fourth side and a fifth side of the window region; a fourth conductive plate connected to one or more mesh lines of the fourth mesh block; a fifth conductive plate connected to one or more mesh lines of the fifth mesh block; and a second conductive bridge connecting the fourth conductive plate and the fifth conductive plate; wherein the plurality of second mesh electrodes further comprises a first conductive plate connected to one or more mesh lines of the first mesh block; and a second conductive plate connected to one or more mesh lines of the second mesh block; wherein the first conductive plate is around an eighth portion of a periphery of the window region; the second conductive bridge is around a ninth portion of the periphery of the window region; and the eighth portion is at least partially overlapping with the ninth portion.

Optionally, the first conductive bridge further comprises a fourth segment crossing over a portion of the second conductive bridge to connect with the first conductive plate; and the fourth segment is in a same layer as the second segment, and is in a layer different from the first segment, the first conductive plate, the second conductive plate, the fourth conductive plate, the fifth conductive plate, and the second conductive bridge.

Optionally, the first conductive bridge further comprises a fifth segment between the fourth segment and the second segment; and wherein the fifth segment is in a same layer as the first segment, and is in a layer different from the second segment and the fourth segment.

Optionally, the display panel further comprises a second dummy plate insulated from the fifth conductive plate and the fifth segment, and spacing part a portion of the fifth conductive plate and a portion of the fifth segment; wherein the fifth segment is around a tenth portion of a periphery of the window region; the second dummy plate is around an eleventh portion of the periphery of the window region; and the tenth portion is at least partially overlapping with the eleventh portion.

Optionally, the display panel further comprises a third dummy plate around a twelfth portion of the periphery of the window region; wherein the second segment is around a second portion of the periphery of the window region; the twelfth portion is between the eleventh portion and the second portion; and the twelfth portion is non-overlapping with the eleventh portion, and is non-overlapping with the second portion.

Optionally, the display panel further comprises a detection line substantially surrounding the window region; wherein the detection line comprises contiguously a first line portion extending counter-clock-wisely around a first half of a periphery of the window region, a second line portion extending clock-wisely around the first half of the periphery of the window region and a second half of the periphery of the window region, and a third line portion extending counter-clock-wisely around the second half of the periphery of the window region.

Optionally, the display panel further comprises a sixth mesh block and a seventh mesh block respectively on two sides of the first mesh block; a first lead line connecting the sixth mesh block to the first line portion; and a second lead line connecting the seventh mesh block to the third line portion.

Optionally, the encapsulating layer comprises a first inorganic encapsulating layer, an organic encapsulating layer on a side of the first inorganic encapsulating layer away from the plurality of light emitting elements, a second inorganic encapsulating layer on a side of the organic encapsulating layer away from the first inorganic encapsulating layer; wherein the display panel further comprises a buffer layer on a side of the second inorganic encapsulating layer away from the organic encapsulating layer; and a touch insulating layer on a side of the buffer layer away from the second inorganic encapsulating layer; wherein the touch insulating layer spaces apart the first segment and the second segment from each other.

In another aspect, the present disclosure provides a display apparatus, comprising the display panel of described herein; an integrated circuit connected to the display panel; and a camera in the window region.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch control structure and a display apparatus that substantially obviate one or more of the problems due to limitations and disadvantages of the related art. In one aspect, the present disclosure provides a touch control structure. In some embodiments, the touch control structure includes a plurality of first mesh electrodes along a row direction and a plurality of second mesh electrodes along a column direction. In some embodiments, the touch control structure is limited in a touch control region and absent in a window region surrounded by the touch control region. Optionally, a window-crossing column of the plurality of second mesh electrodes includes a first mesh block and a second mesh block respectively on a first side and a second side of the window region; a first conductive plate directly connected to one or more mesh lines of the first mesh block; a second conductive plate directly connected to one or more mesh lines of the second mesh block; and a first conductive bridge connecting the first conductive plate and the second conductive plate. Optionally, the first conductive bridge comprises a first segment and a second segment; and the second segment is in a layer different from the first segment, the first conductive plate, and the second conductive plate. The column direction and the row direction cross over each other. Optionally, the column direction and the row direction are perpendicular to each other. Optionally, the column direction and the row direction cross over each other at an inclined angle that is not 90 degrees.

Mesh electrodes include mesh lines which typically have a line width in a range of 1 μm to 50 μm. Thus, connecting adjacent mesh blocks through the mesh lines is particularly difficult, and often resulting in poor connectivity. The present disclosure adopts a novel and advantageous touch electrode design that obviate issues in related touch control structures.

Figure 1:
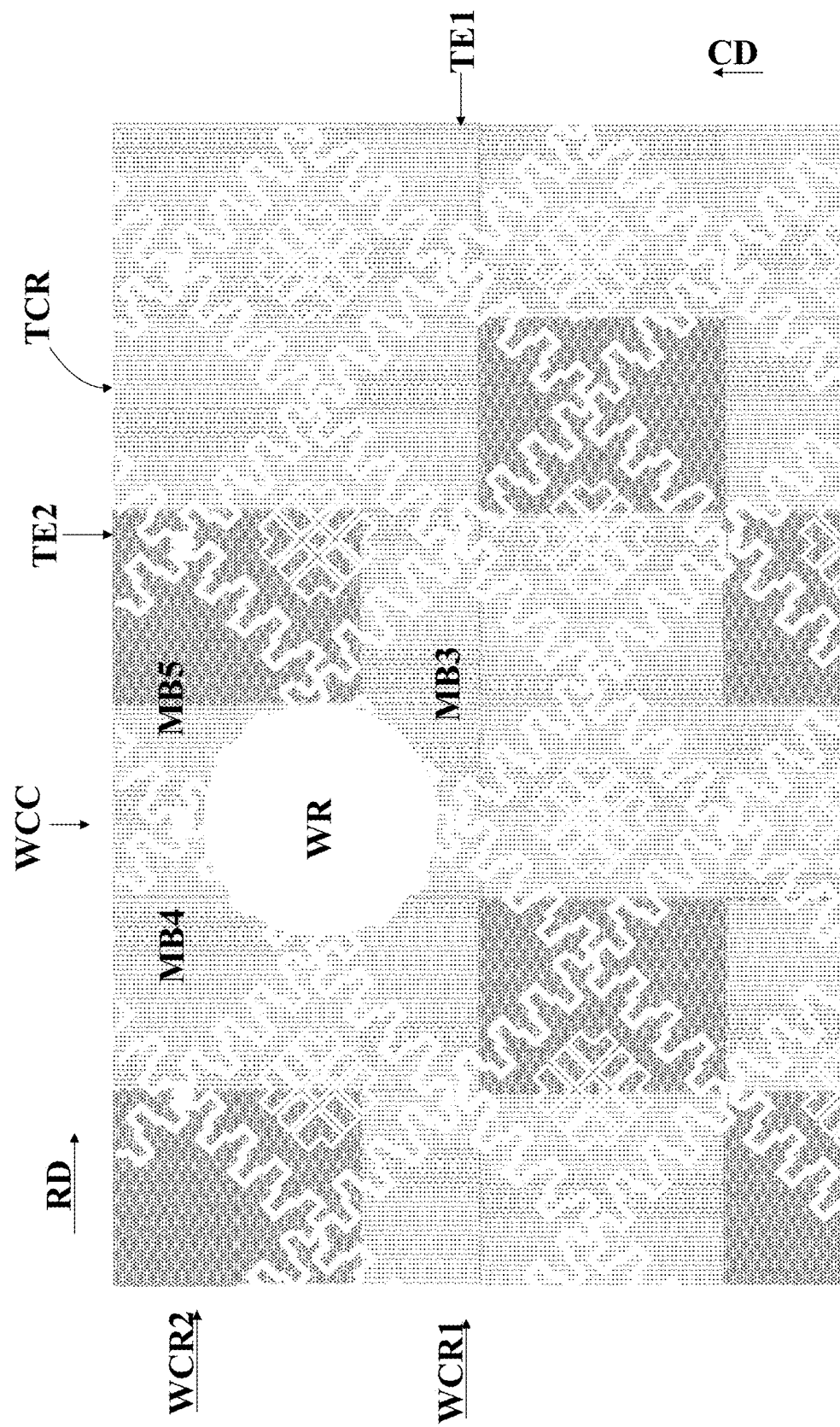
FIG. 1 is a schematic diagram illustrating the structure of a touch control structure in some embodiments according to the present disclosure.

FIG. 1 is a schematic diagram illustrating the structure of a touch control structure in some embodiments according to the present disclosure. Referring to FIG. 1, the touch control structure in some embodiments includes a plurality of first mesh electrodes TE1 arranged respectively in a plurality of rows and a plurality of second mesh electrodes TE2 arranged in respectively a plurality of columns. Adjacent rows of the plurality of rows are isolated from each other. Adjacent columns of the plurality of columns are isolated from each other. Optionally, the touch control structure is a mutual capacitance type touch control structure. Optionally, the plurality of first mesh electrodes TE1 are a plurality of touch scanning electrodes, and the plurality of second mesh electrodes TE2 are a plurality of touch sensing electrodes. Optionally, the plurality of mesh touch electrodes TE1 are a plurality of touch sensing electrodes, and the plurality of second mesh electrodes TE2 are a plurality of touch scanning electrodes. Optionally, the touch control structure is in a touch control region of a display panel. Optionally, the touch control region substantially overlaps with a display region of the display panel. The display panel is configured to display an image in at least a portion of the touch control region.

In some embodiments, the respective one of the plurality of first mesh electrodes TE1 extends along a row direction RD; and the respective one of the plurality of second mesh electrodes TE2 extends along a column direction CD. Optionally, the row direction RD and the column direction CD are two non-parallel directions, for example, the row direction RD and the column direction CD cross over each other. Optionally, the row direction RD and the column direction CD are perpendicular to each other. Optionally, the row direction RD and the column direction CD cross over each other at an inclined angle that is not 90 degrees.

In some embodiments, the touch control structure is limited in a touch control region TCR and absent in a window region WR surrounded by the touch control region TCR. For example, the touch control structure may be a touch control structure in a display panel, where the touch control region TCR substantially overlaps with a display region of the display panel, and the window region WR is a region in the display panel having a hole configured for installing an accessory such as a camera lens or a fingerprint sensor. The display panel is configured to display an image in at least a portion of the touch control region TCR. In one example, in the window region WR, display elements of the display panel and the touch control structure are absent; in the display region or at least a portion of the touch control region TCR, both display elements of the display panel and the touch control structure are present.

Figure 2:
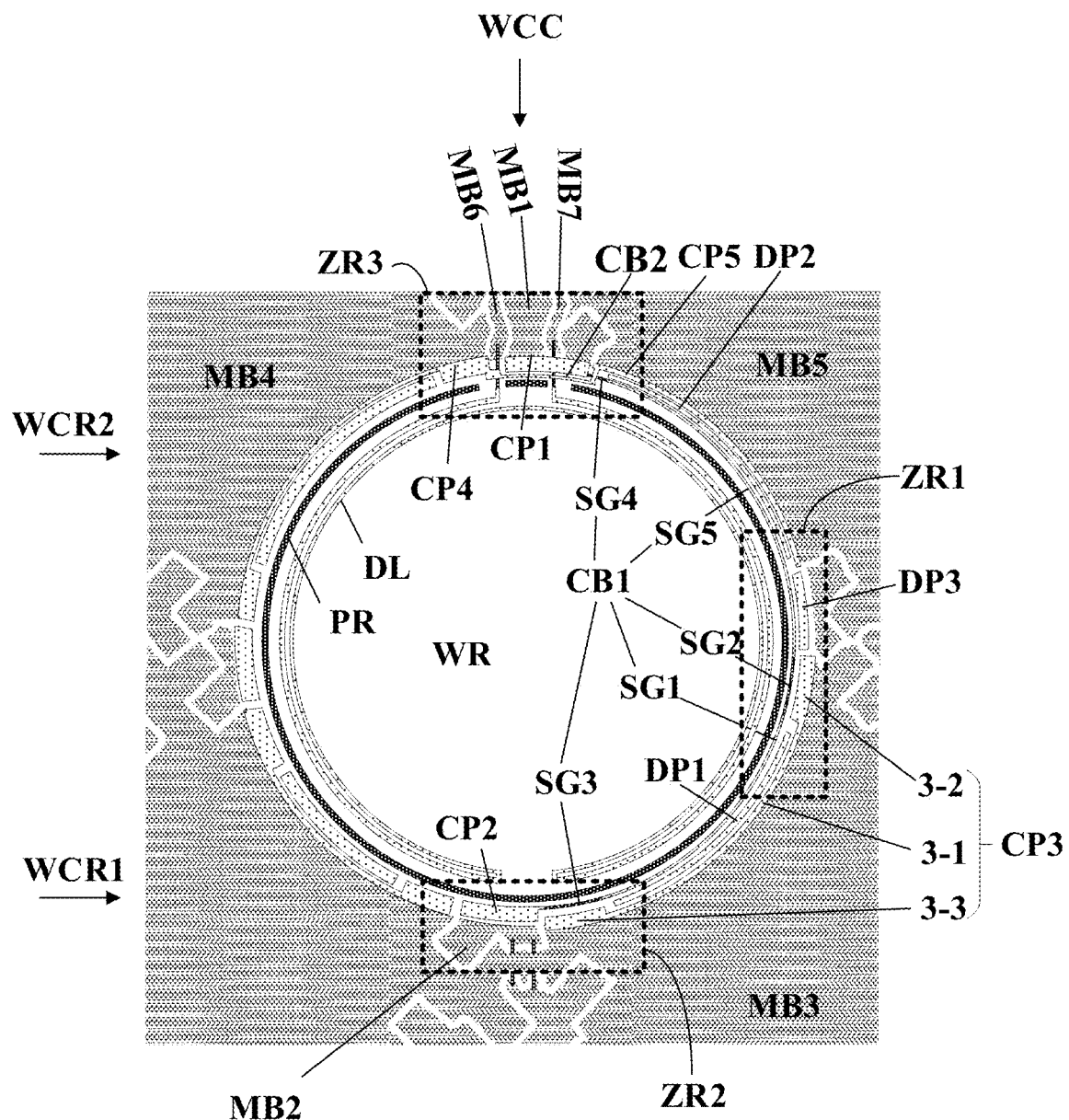
FIG. 2 is a zoom-in view of a touch control structure surrounding a window region in some embodiments according to the present disclosure.
Figure 3:
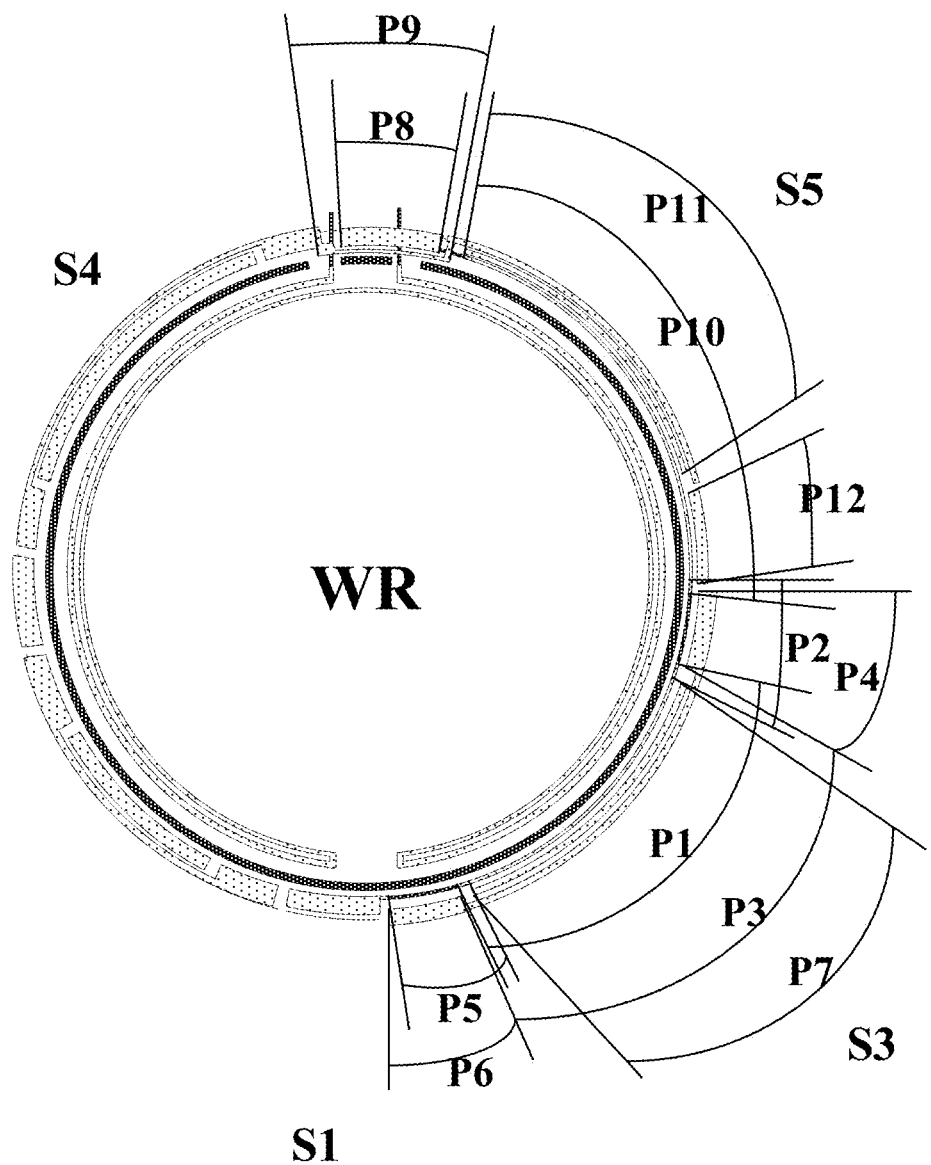
FIG. 3 is a schematic diagram illustrating a window region in some embodiments according to the present disclosure.

FIG. 2 is a zoom-in view of a touch control structure surrounding a window region in some embodiments according to the present disclosure. FIG. 3 is a schematic diagram illustrating a window region in some embodiments according to the present disclosure. Referring to FIG. 1 to FIG. 3, in some embodiments, a window-crossing column WCC of the plurality of second mesh electrodes TE2 includes a first mesh block MB1 and a second mesh block MB2 respectively on a first side S1 and a second side S2 of the window region WR; a first conductive plate CP1 directly connected to one or more mesh lines of the first mesh block MB1; a second conductive plate CP2 directly connected to one or more mesh lines of the second mesh block MB2; and a first conductive bridge CB1 connecting the first conductive plate CP1 and the second conductive plate CP2.

In some embodiments, the first conductive bridge CB1 includes a first segment SG1 and a second segment SG2. In some embodiments, the second segment SG2 is in a layer different from the first segment SG1, the first conductive plate CP1, and the second conductive plate CP2. In one example, the second segment SG2 is in a first layer, e.g., a first conductive material layer such as a first metallic material layer. In another example, the first segment SG1, the first conductive plate CP1, and the second conductive plate CP2 are in a second layer, e.g., a second conductive material layer such as a second metallic material layer.

Figure 4A:
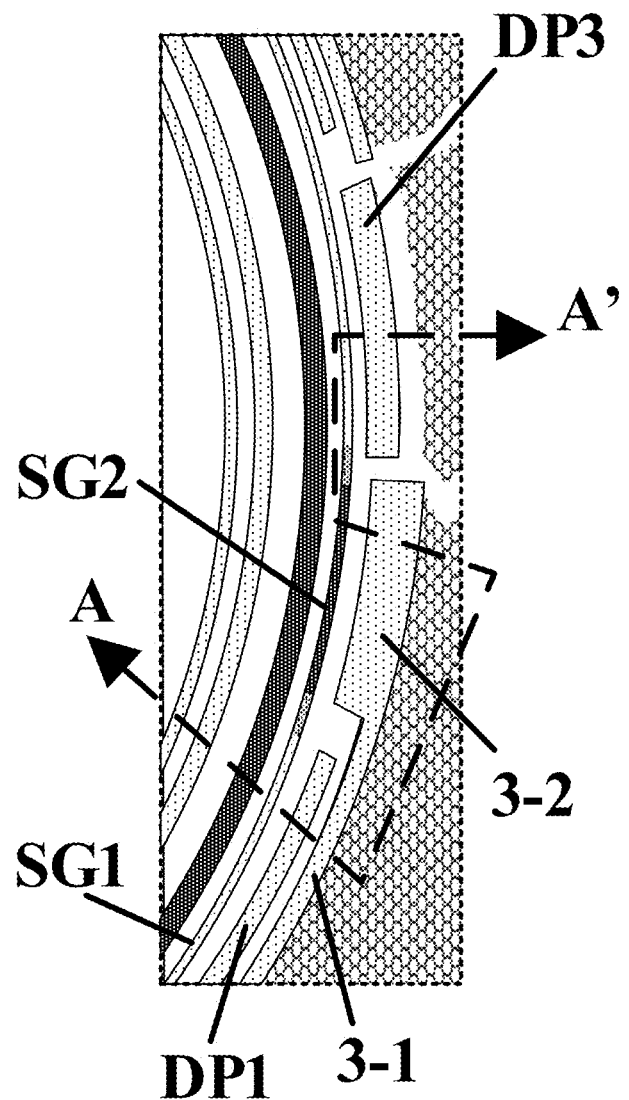
FIG. 4A is a zoom-in view of a first zoom-in region ZR1 in FIG. 2.
Figure 4B:
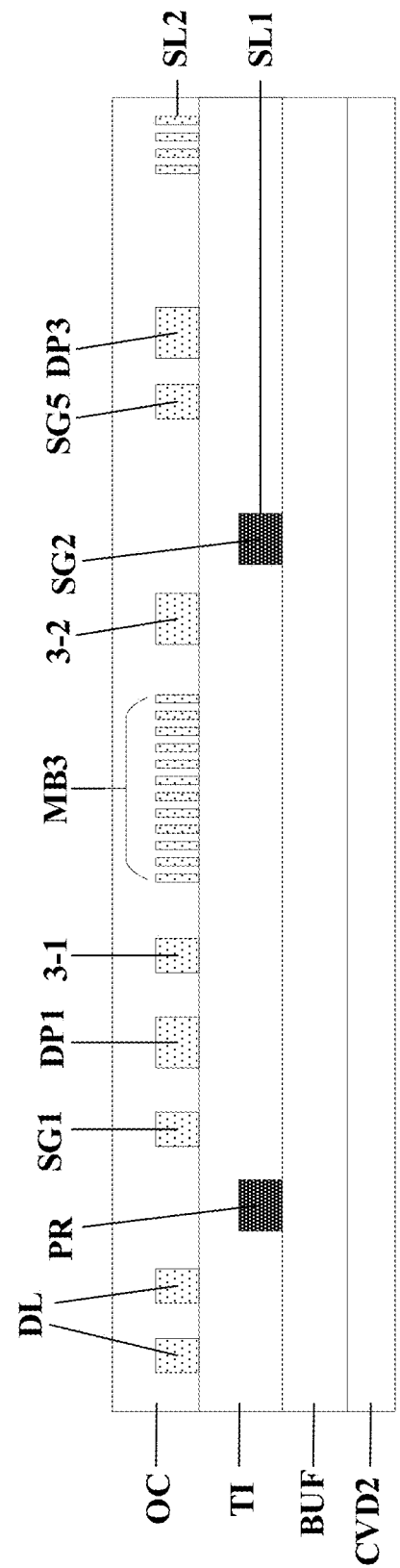
FIG. 4B is a cross-sectional view along an A-A' line in FIG. 4A.

FIG. 4A is a zoom-in view of a first zoom-in region ZR1 in FIG. 2. FIG. 4B is a cross-sectional view along an A-A' line in FIG. 4A. Referring to FIG. 4A and FIG. 4B, in some embodiments, the first segment SG1 is in a second layer SL2, and the second segment SG2 is in a first layer SL1. In one example as depicted in FIG. 4B, the touch control structure includes a buffer layer BUF on a second inorganic encapsulating sub-layer CVD2, the second inorganic encapsulating sub-layer CVD2 being a sub-layer of an encapsulating layer for encapsulating light emitting elements in a display apparatus having the touch control structure. In some embodiments, the touch control structure further includes a first layer SL1 on a side of the buffer layer BUF away from the second inorganic encapsulating sub-layer CVD2, a touch insulating layer TI on a side of the first layer SL1 away from the buffer layer BUF, a second layer SL2 on a side of the touch insulating layer TI away from the first layer SL1, and an overcoat layer OC on a side of the second layer SL2 away from the touch insulating layer TI. Optionally, mesh lines of the third mesh block MB3 are in the second layer SL2.

Referring to FIG. 1 to FIG. 3, in some embodiments, a first window-crossing row WCR1 of the plurality of first mesh electrodes TE1 includes a third mesh block MB3 on a third side S3 of the window region WR; and a third conductive plate CP3 directly connected to one or more mesh lines of the third mesh block MB3. The third side S3 is between the first side S1 and the second side S2. The third conductive plate CP3 spaces apart the first conductive bridge CB1 from the third mesh block MB3.

Figure 5:
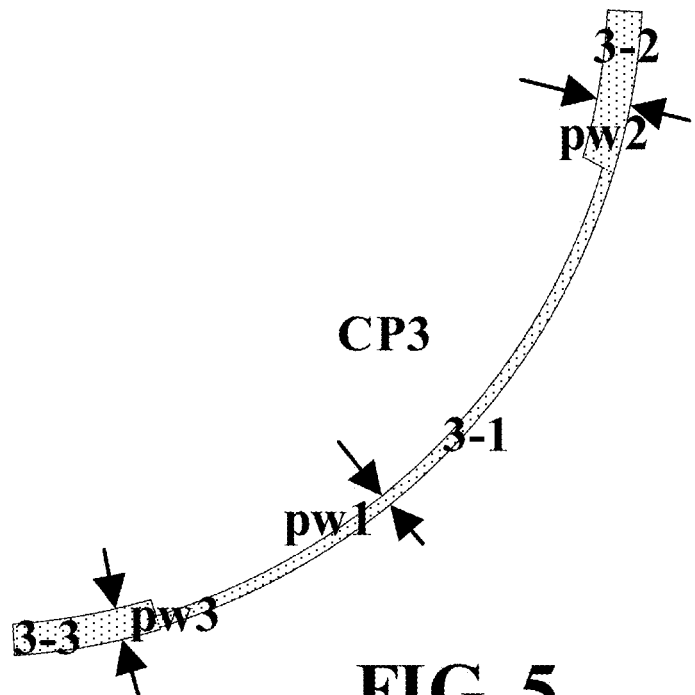
FIG. 5 is a schematic diagram illustrating the structure of a third conductive plate in some embodiments according to the present disclosure.

FIG. 5 is a schematic diagram illustrating the structure of a third conductive plate in some embodiments according to the present disclosure. Referring to FIG. 2 and FIG. 5, in some embodiments, the third conductive plate CP3 includes a first part 3-1 and a second part 3-2. The first part has a first shortest plate width pw1 along a direction from the first part 3-1 to the window region WR; the second part 3-2 has a second shortest plate width pw2 along a direction from the second part 3-2 to the window region WR. Optionally, the first shortest plate width pw1 is less than the second shortest plate width pw2.

The inventors of the present disclosure discover that, when a conductive bridge extends around a periphery of the window region, electrostatic discharge is prone to occur when the conductive bridge is in close proximity to a conductive plate directly connected to one or more mesh lines of a mesh block. For example, the first conductive bridge CB1 is in close proximity to the second part 3-2 of the third conductive plate CP3. The inventors of the present disclosure discover that, surprisingly and unexpected, the electrostatic discharge issue can be obviated by disposing a segment of the conductive bridge in close proximity to the conductive plate in a layer different from the conductive plate.

In some embodiments, as shown in FIG. 2, the second segment SG2 is in close proximity to a second part 3-2 of the third conductive plate CP3. Accordingly, in some embodiment, in the touch control structure according to the present disclosure, the second segment SG2 is in a layer different from the third conductive plate CP3. Referring to FIG. 4B, the second segment SG2 is in the first layer SL1, whereas the first part 3-1 and the second part 3-2 of the third conductive plate, and the first segment SG1 are in the second layer SL2.

Referring to FIG. 3, in some embodiments, the first segment SG1 and the second segment SG2 are respectively around a first portion P1 and a second portion P2 of the periphery of the window region WR; the first part 3-1 and the second part 3-2 are respectively around a third portion P3 and a fourth portion P4 of the periphery of the window region WR; the first portion P1 is at least partially overlapping with the third portion P3; and the second portion P2 is at least partially overlapping with the fourth portion P4. Optionally, the second portion P2 and the fourth portion P4 substantially (e.g., 80%, 85%, 90%, 95%, 99%, or 100%) overlap with each other. Optionally, the first portion P1 and the third portion P3 substantially (e.g., 80%, 85%, 90%, 95%, 99%, or 100%) overlap with each other.

In some embodiments, and referring to FIG. 2 and FIG. 5, the third conductive plate further includes a third part 3-3, the first part 3-1 between the second part 3-2 and the third part 3-3. Optionally, the second part 3-2 and the third part 3-3 are connected through the first part 3-1. Optionally, the second part 3-2 is directly connected to the first part 3-1, and the third part 3-3 is directly connected to the first part 3-1. Referring to FIG. 2, the first conductive bridge CB1 further includes a third segment SG3, the first segment SG1 between the second segment SG2 and the third segment SG3. Optionally, the second segment SG2 and the third segment SG3 are connected through the first segment SG1. Optionally, the second segment SG2 is directly connected to the first segment SG1, and the third segment SG3 is directly connected to the first segment SG1.

In some embodiments, the third segment SG3 is in a same layer as the second segment SG2, and is in a layer different from the first segment SG1, the first conductive plate CP1, the second conductive plate CP2, and the third conductive plate CP3. As used herein, the term "same layer" refers to the relationship between the layers simultaneously formed in the same step. In one example, the second segment SG2 and the third segment SG3 are in a same layer when they are formed as a result of one or more steps of a same patterning process performed in a material deposited in a same deposition process. In another example, the second segment SG2 and the third segment SG3 can be formed in a same layer by simultaneously performing the step of forming the second segment SG2 and the step of forming the third segment SG3. The term "same layer" does not always mean that the thickness of the layer or the height of the layer in a cross-sectional view is the same.

Figure 6A:
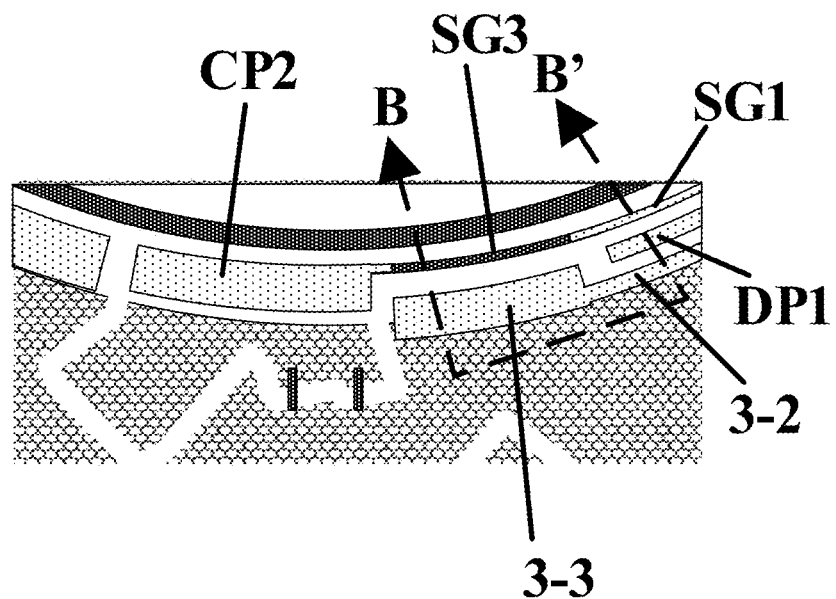
FIG. 6A is a zoom-in view of a second zoom-in region ZR2 in FIG. 2.
Figure 6B:
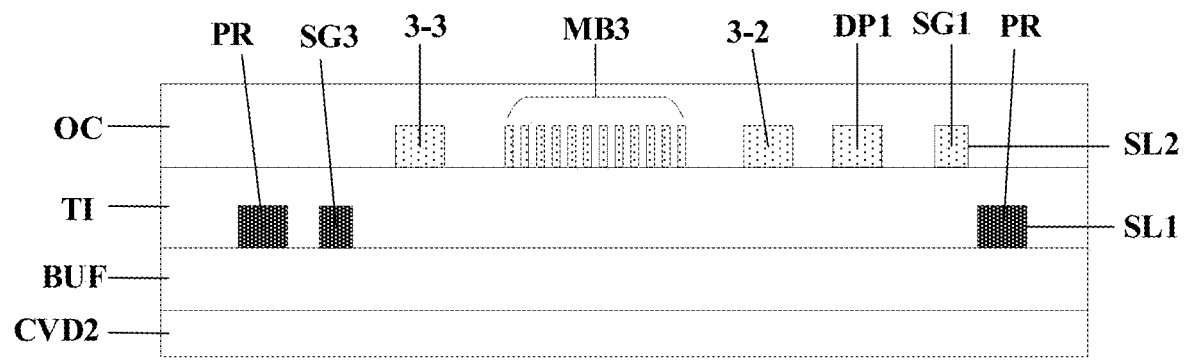
FIG. 6B is a cross-sectional view along a B-B' line in FIG. 6A.

FIG. 6A is a zoom-in view of a second zoom-in region ZR2 in FIG. 2. FIG. 6B is a cross-sectional view along a B-B' line in FIG. 6A. Referring to FIG. 6A, FIG. 6B, FIG. 4A, and FIG. 4B, the second segment SG2 and the third segment SG3 are in the first layer SL1. The first segment SG1, the first part 3-1, the second part 3-2, the third part 3-3, mesh lines of the third mesh block MB3, are in the second layer SL2.

Referring to FIG. 3, in some embodiments, the third segment SG3 is around a fifth portion P5 of the periphery of the window region WR; the third part 3-3 is around a sixth portion P6 of the periphery of the window region WR; the fifth portion P5 is at least partially overlapping with the sixth portion P6. Optionally, the fifth portion P5 and the sixth portion P6 substantially (e.g., 80%, 85%, 90%, 95%, 99%, or 100%) overlap with each other.

Referring to FIG. 2 and FIG. 5, in some embodiments, the first part has a first shortest plate width pw1 along a direction from the first part 3-1 to the window region WR; the second part 3-2 has a second shortest plate width pw2 along a direction from the second part 3-2 to the window region WR; and the third part 3-3 has a third shortest plate width pw3 along a direction from the third part 3-3 to the window region WR. Optionally, the first shortest plate width pw1 is less than the second shortest plate width pw2; and the first shortest plate width pw1 is less than the third shortest plate width pw3.

Referring to FIG. 2, FIG. 4A, FIG. 4B, FIG. 6A, and FIG. 6B, the touch control structure in some embodiments further includes a first dummy plate DP1 insulated from the first conductive bridge CB1 and the third conductive plate CP3, and spacing part a portion of the first conductive bridge CB1 and a portion of the third conductive plate CP3. Referring to FIG. 3, the first dummy plate DP1 is around a seventh portion P7 of the periphery of the window region WR. Optionally, the seventh portion P7 is at least partially overlapping with the third portion P3, and is non-overlapping with the fourth portion P4 and the sixth portion P6. Optionally, the third portion P3 and the seventh portion P7 substantially (e.g., 80%, 85%, 90%, 95%, 99%, or 100%) overlap with each other.

In some embodiments, and referring to FIG. 2, FIG. 4A, FIG. 4B, FIG. 6A, and FIG. 6B, in an orthographic projection of the touch control structure on a base substrate (e.g., the second inorganic encapsulating sub-layer CVD2), an orthographic projection of a conductive component on the base substrate is absent in a space between an orthographic projection of the second segment SG2 on the base substrate and an orthographic projection of the second part 3-2 on the base substrate. Optionally, in the orthographic projection of the touch control structure on the base substrate, an orthographic projection of a conductive component on the base substrate is absent in a space between an orthographic projection of the third segment SG3 on the base substrate and an orthographic projection of the third part 3-3 on the base substrate. Optionally, in the orthographic projection of the touch control structure on the base substrate, an orthographic projection of the first dummy plate DP1 on the base substrate is in a space between an orthographic projection of the first segment SG1 on the base substrate and an orthographic projection of the first part 3-1 on the base substrate.

In some embodiments, and referring to FIG. 2, a second window-crossing row WCR2 of the plurality of first mesh electrodes TE1 includes a fourth mesh block MB4 and a fifth mesh block MB5 respectively on a fourth side S4 and a fifth side S5 of the window region. Optionally, the second side S2 is between the fourth side S4 and the fifth side S5. Optionally, the fifth side S5 is between the second side S2 and the third side S3. Optionally, the fourth side S4 is between the first side S1 and the second side S2.

In some embodiments, the second window-crossing row WCR2 of the plurality of first mesh electrodes TE1 further includes a fourth conductive plate CP4 directly connected to one or more mesh lines of the fourth mesh block MB4; a fifth conductive plate CP5 directly connected to one or more mesh lines of the fifth mesh block MB5; and a second conductive bridge CB2 connecting the fourth conductive plate CP4 and the fifth conductive plate CP5. Referring to FIG. 3, the first conductive plate CP1 is around an eighth portion P8 of the periphery of the window region WR; and the second conductive bridge CB2 is around a ninth portion P9 of the periphery of the window region WR. Optionally, the eighth portion P8 is at least partially overlapping with the ninth portion P9. Optionally, the eighth portion P8 and the ninth portion P9 substantially (e.g., 80%, 85%, 90%, 95%, 99%, or 100%) overlap with each other.

Figure 7:
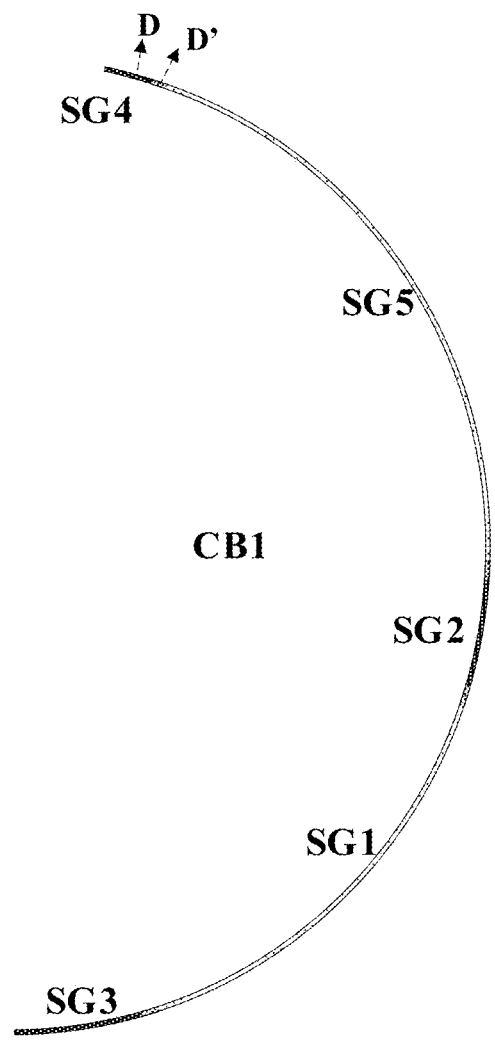
FIG. 7 is a schematic diagram illustrating the structure of a first conductive bridge in some embodiments according to the present disclosure.
Figure 8A:
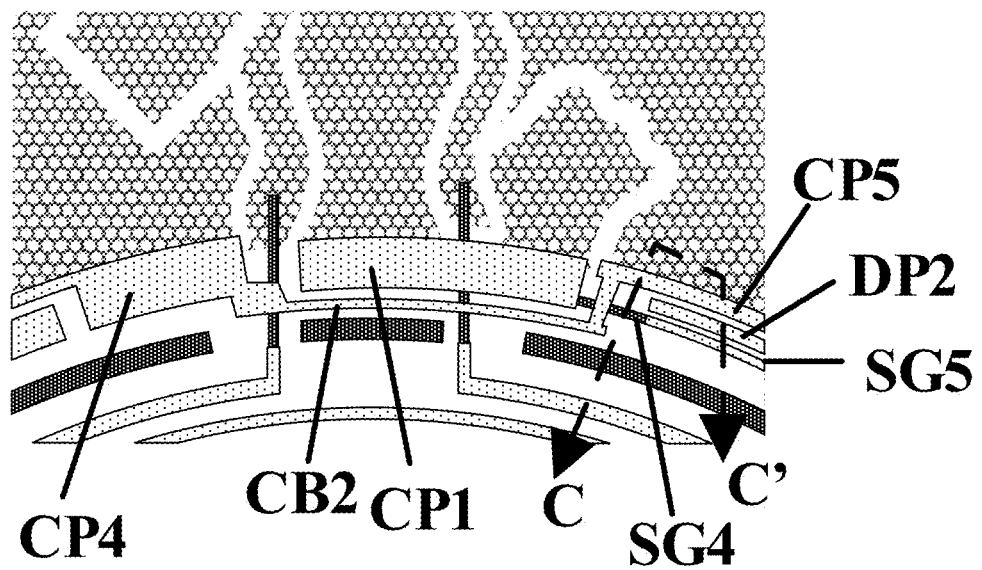
FIG. 8A is a zoom-in view of a third zoom-in region ZR3 in FIG. 2.
Figure 8B:
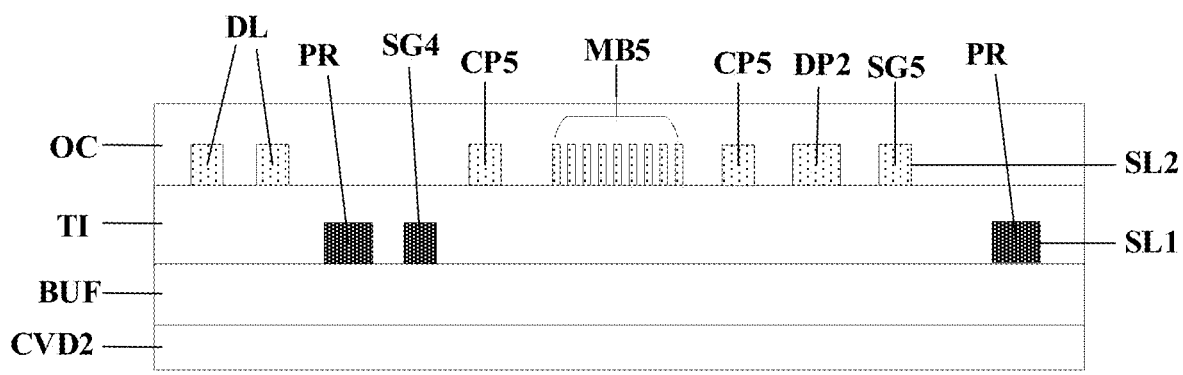
FIG. 8B is a cross-sectional view along a C-C' line in FIG. 8A.

FIG. 7 is a schematic diagram illustrating the structure of a first conductive bridge in some embodiments according to the present disclosure. Referring to FIG. 2 and FIG. 7, in some embodiments, the first conductive bridge CB1 further includes a fourth segment SG4. FIG. 8A is a zoom-in view of a third zoom-in region ZR3 in FIG. 2. FIG. 8B is a cross-sectional view along a C-C' line in FIG. 8A. Referring to FIG. 2, FIG. 8A, and FIG. 8B, the fourth segment SG4 in some embodiments crosses over a portion of the second conductive bridge CB2 to connect with the first conductive plate CP1.

In some embodiments, the fourth segment SG4 is in a same layer as the second segment SG2 and the third segment SG3, and is in a layer different from the first segment SG1, the first conductive plate CP1, the second conductive plate CP2, and the third conductive plate CP3. Optionally, the fourth segment SG4 is in a layer different from the first segment SG1, the first conductive plate CP1, the second conductive plate CP2, the fourth conductive plate CP4, the fifth conductive plate CP5, and the second conductive bridge CB2. Optionally, mesh lines of the fifth mesh block MB5 are in the second layer SL2.

Referring to FIG. 2, FIG. 7, FIG. 8A, and FIG. 8B, the first conductive bridge in some embodiments further includes a fifth segment SG5 between the fourth segment SG4 and the second segment SG2. Optionally, the second segment SG2 and the fourth segment SG4 are connected through the fifth segment SG5. Optionally, the second segment SG2 is directly connected to the fifth segment SG5, and the fourth segment SG4 is directly connected to the fifth segment SG5.

Figure 9:
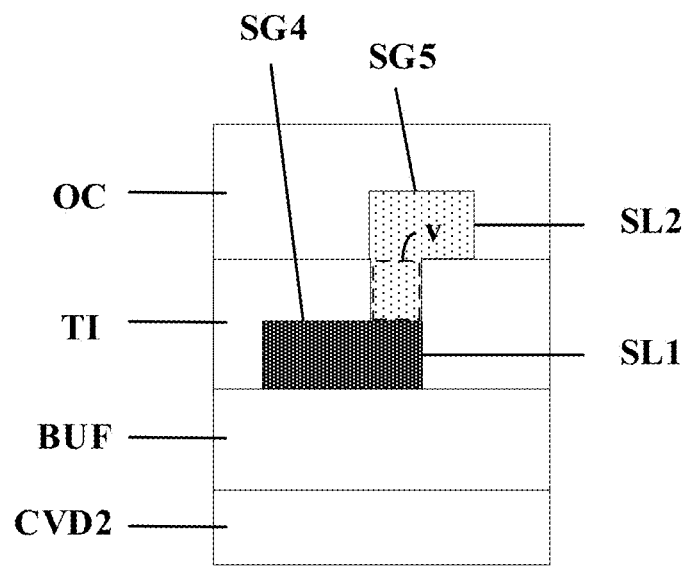
FIG. 9 is a cross-sectional view along a D-D' line in FIG. 7.

FIG. 9 is a cross-sectional view along a D-D' line in FIG. 7. Referring to FIG. 7, in some embodiments, the fifth segment SG5 is directly connected to the fourth segment SG4 through a via v extending through the touch insulating layer TI. The connections between other respective segments of the first conductive bridge CB1 can be similarly implemented. For example, the connection between the first segment SG1 and the second segment SG2, the connection between the first segment SG1 and the third segment SG3, or the connection between the second segment SG2 and the fifth segment SG5, can be implemented by respective vias extending through the touch insulating layer TI.

Referring to FIG. 8A and FIG. 8B, in some embodiments, the fifth segment SG5 is in a same layer as the first segment SG1, the first conductive plate CP1, the second conductive plate CP2, the third conductive plate CP3, and the second conductive bridge CB2. Optionally, the fifth segment SG5 is in a layer different from the second segment SG2 and the fourth segment SG4.

Referring to FIG. 2, FIG. 8A and FIG. 8B, in some embodiments, the touch control structure further includes a second dummy plate DP2 insulated from the fifth conductive plate CP5 and the fifth segment SG5, and spacing part a portion of the fifth conductive plate CP5 and a portion of the fifth segment SG5. Referring to FIG. 3, in some embodiments, the fifth segment SG5 is around a tenth portion P10 of the periphery of the window region WR. Optionally, the second dummy plate DP2 is around an eleventh portion P11 of the periphery of the window region WR. Optionally, the tenth portion P10 is at least partially overlapping with the eleventh portion P11. Optionally, a sub-portion of the tenth portion P10 is non-overlapping with the eleventh portion P11.

Referring to FIG. 2, FIG. 3, FIG. 4A, and FIG. 4B, the touch control structure in some embodiments further includes a third dummy plate DP3 around a twelfth portion P12 of the periphery of the window region WR. Optionally, the twelfth portion P12 is between the eleventh portion P11 and the second portion. Optionally, the twelfth portion P12 is non-overlapping with the eleventh portion P11, and is non-overlapping with the second portion P2. Optionally, the twelfth portion P12 is at least partially overlapping with the tenth portion P10. Optionally, a combination of the eleventh portion P11 and the twelfth portion P12 substantially (e.g., 80%, 85%, 90%, 95%, 99%, or 100%) overlap with the tenth portion P10.

Referring to FIG. 2, the touch control structure in some embodiments further includes a protective ring PR substantially (e.g., 80%, 85%, 90%, 95%, 99%, or 100%) surrounding the window region WR. Referring to FIG. 2, in some embodiments, the first conductive plate CP1, the second conductive plate CP2, and the first conductive bridge CB1 are respectively around portions of the protective ring PR. Referring to FIG. 2, FIG. 4B, FIG. 6B, and FIG. 8B, in some embodiments, the protective ring PR is in a same layer as the second segment SG2, the third segment SG3, and the fourth segment SG4. Optionally, the protective ring PR is in a layer different from the first segment SG1, the fifth segment SG5, the first conductive plate CP1, the second conductive plate CP2, the third conductive plate CP3, the fourth conductive plate CP4, and the fifth conductive plate CP5.

Figure 10:
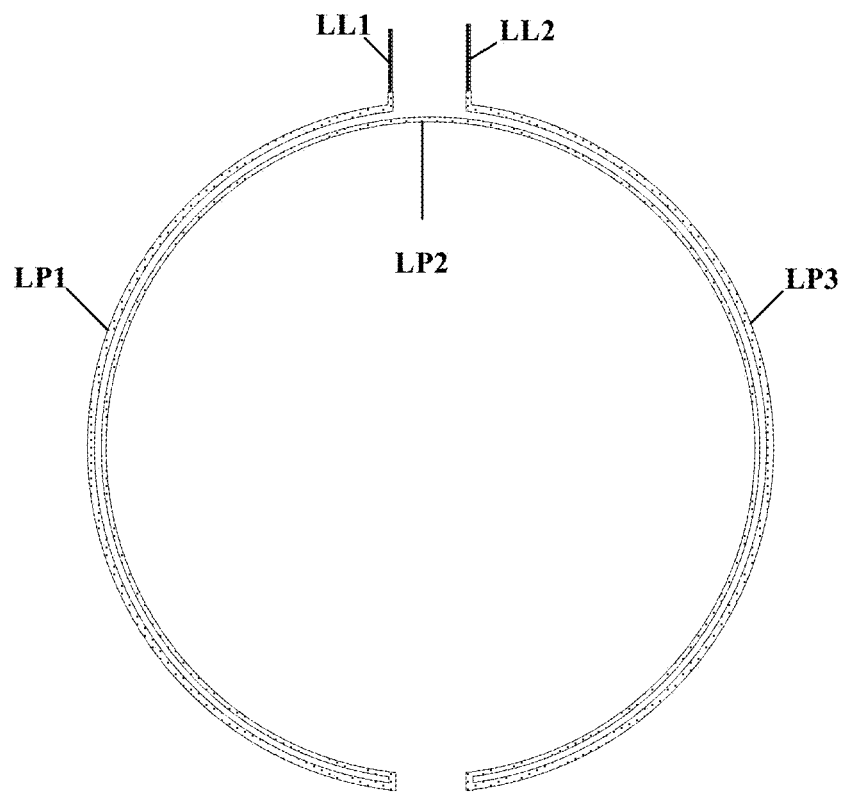
FIG. 10 is a schematic diagram illustrating the structure of a detection line in some embodiments according to the present disclosure.

Referring to FIG. 2, the touch control structure in some embodiments further includes a detection line DL substantially (e.g., 80%, 85%, 90%, 95%, 99%, or 100%) surrounding the window region WR. FIG. 10 is a schematic diagram illustrating the structure of a detection line in some embodiments according to the present disclosure. Referring to FIG. 2 and FIG. 10, in some embodiments, the detection line DL includes contiguously a first line portion LP1 extending counter-clock-wisely around a first half (e.g., a left half) of a periphery of the window region WR, a second line portion LP2 extending clock-wisely around the first half of the periphery of the window region WR and a second half of the periphery of the window region WR, and a third line portion LP3 extending counter-clock-wisely around the second half of the periphery of the window region WR. As used herein, the term "first half" and "second half" is not limited to exact half, but also include less than half or greater than half.

Referring to FIG. 2 and FIG. 10, the touch control structure in some embodiments further includes a sixth mesh block MB6 and a seventh mesh block MB7 respectively on two sides of the first mesh block MB1; a first lead line LL1 connecting the sixth mesh block MB6 to the first line portion LP1; and a second lead line LL2 connecting the seventh mesh block MB7 to the third line portion LP3.

In some embodiments, the first line portion LP1, the second line portion LP2, the third line portion LP3 are in a same layer as the first segment SG1, the fifth segment SG5, the first conductive plate CP1, the second conductive plate CP2, the third conductive plate CP3, the fourth conductive plate CP4, and the fifth conductive plate CP5. In some embodiments, the first lead line LL1 and the second lead line LL2 are in a same layer as the second segment SG2, the third segment SG3, and the fourth segment SG4.

In some embodiments, the first conductive bridge CB1 (or segments thereof) has a line width in a range of 5 μm to 15 μm, e.g., 5 μm to 7 μm, 7 μm to 9 μm, 9 μm to 11 μm, 11 μm to 13 μm, or 13 μm to 15 μm. Optionally, the first conductive bridge CB1 (or segments thereof) has a line width of 10 μm.

In some embodiments, the second conductive bridge CB2 (or segments thereof) has a line width in a range of 10 μm to 20 μm, e.g., 10 μm to 12 μm, 12 μm to 14 μm, 14 μm to 16 μm, 16 μm to 18 μm, or 18 μm to 20 μm. Optionally, the second conductive bridge CB2 (or segments thereof) has a line width of 15 μm.

In some embodiments, the first shortest plate width pw1 is in a range of 20 μm to 40 μm, e.g., 20 μm to 25 μm, 25 μm to 30 μm, 30 μm to 35 μm, or 35 μm to 40 μm. Optionally, the first shortest plate width pw1 is 30 μm.

In some embodiments, the second shortest plate width pw2 is in a range of 75 μm to 115 μm, e.g., 75 μm to 85 μm, 85 μm to 95 μm, 95 μm to 105 μm, or 105 μm to 115 μm. Optionally, the second shortest plate width pw2 is 95 μm.

In some embodiments, the third shortest plate width pw3 is in a range of 75 μm to 115 μm, e.g., 75 μm to 85 μm, 85 μm to 95 μm, 95 μm to 105 μm, or 105 μm to 115 μm. Optionally, the third shortest plate width pw3 is 95 μm.

Optionally, a ratio of the first shortest plate width pw1 to the second shortest plate width pw2 is a range of 1:2 to 1:4, e.g., 1:2 to 1:2.5, 1:2.5 to 1:3, 1:3 to 1:3.5, or 1:3.5 to 1:4. Optionally, a ratio of the first shortest plate width pw1 to the third shortest plate width pw3 is a range of 1:2 to 1:4, e.g., 1:2 to 1:2.5, 1:2.5 to 1:3, 1:3 to 1:3.5, or 1:3.5 to 1:4.

In some embodiments, the first conductive plate has a shortest plate width along a direction from the first conductive plate to the window region in a range of 80 μm to 160 μm, e.g., 80 μm to 100 μm, 100 μm to 120 μm, 120 μm to 140 μm, or 140 μm to 160 μm. Optionally, the shortest plate width is 120 μm.

In some embodiments, the second conductive plate has a shortest plate width along a direction from the second conductive plate to the window region in a range of 80 μm to 160 μm, e.g., 80 μm to 100 μm, 100 μm to 120 μm, 120 μm to 140 μm, or 140 μm to 160 μm. Optionally, the shortest plate width is 120 μm.

In some embodiments, the first dummy plate has a shortest plate width along a direction from the first dummy plate to the window region in a range of 30 μm to 70 μm, e.g., 30 μm to 40 μm, 40 μm to 50 μm, 50 μm to 60 μm, or 60 μm to 70 μm. Optionally, the shortest plate width is 50 μm.

In some embodiments, the second dummy plate has a shortest plate width along a direction from the second dummy plate to the window region in a range of 20 μm to 40 μm, e.g., 20 μm to 25 μm, 25 μm to 30 μm, 30 μm to 35 μm, or 35 μm to 40 μm. Optionally, the shortest plate width is 30 μm.

In some embodiments, the fourth conductive plate has a shortest plate width along a direction from the fourth conductive plate to the window region in a range of 5 μm to 15 μm, e.g., 5 μm to 7 μm, 7 μm to 9 μm, 9 μm to 11 μm, 11 μm to 13 μm, or 13 μm to 15 μm. Optionally, the shortest plate width is 10 μm.

In some embodiments, the fifth conductive plate has a shortest plate width along a direction from the fifth conductive plate to the window region in a range of 30 μm to 70 μm, e.g., 30 μm to 40 μm, 40 μm to 50 μm, 50 μm to 60 μm, or 60 μm to 70 μm. Optionally, the shortest plate width is 50 μm.

In some embodiments, the protective ring has a shortest plate width along a direction from the protective ring to the window region in a range of 25 μm to 65 μm, e.g., 25 μm to 35 μm, 35 μm to 45 μm, 45 μm to 55 μm, or 55 μm to 65 μm. Optionally, the shortest plate width is 45 μm.

In some embodiments, the detection line (or line portions thereof) has a line width in a range of 2.5 μm to 6.5 μm, e.g., 2.5 μm to 3.5 μm, 3.5 μm to 4.5 μm, 4.5 μm to 5.5 μm, or 5.5 μm to 6.5 μm. Optionally, the first conductive bridge CB1 (or segments thereof) has a line width of 4.5 μm.

In some embodiments, the first lead line or the second lead line has a line width in a range of 5 μm to 15 μm, e.g., 5 μm to 7 μm, 7 μm to 9 μm, 9 μm to 11 μm, 11 μm to 13 μm, or 13 μm to 15 μm. Optionally, the first lead line or the second lead line has a line width of 10 μm.

Figure 11A:
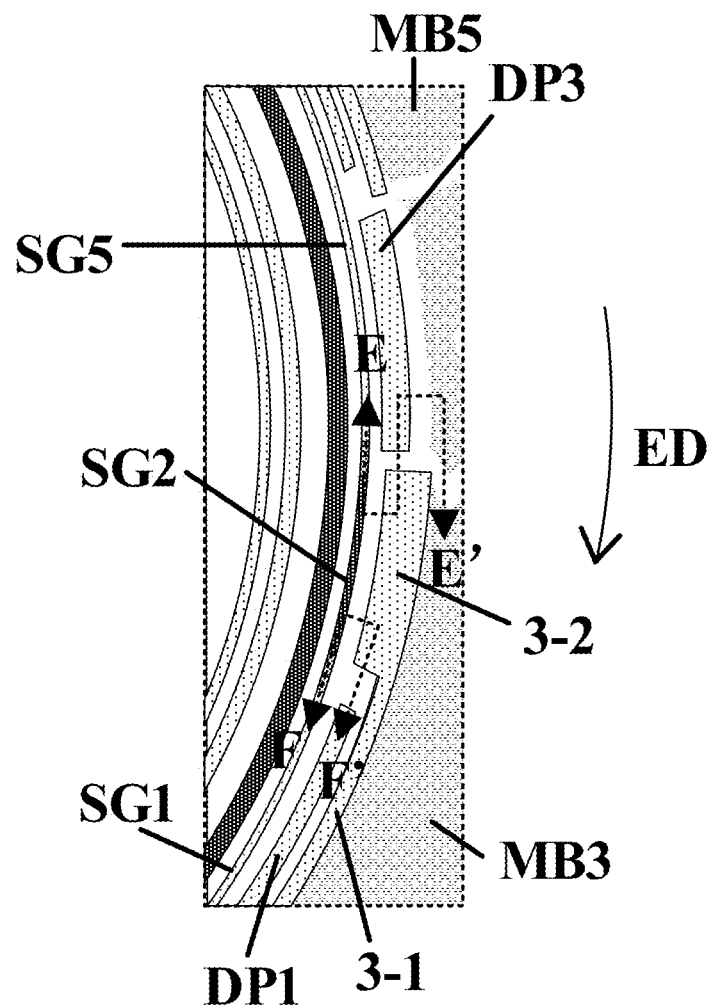
FIG. 11A is a zoom-in view of a first zoom-in region ZR1 in FIG. 2.
Figure 11B:
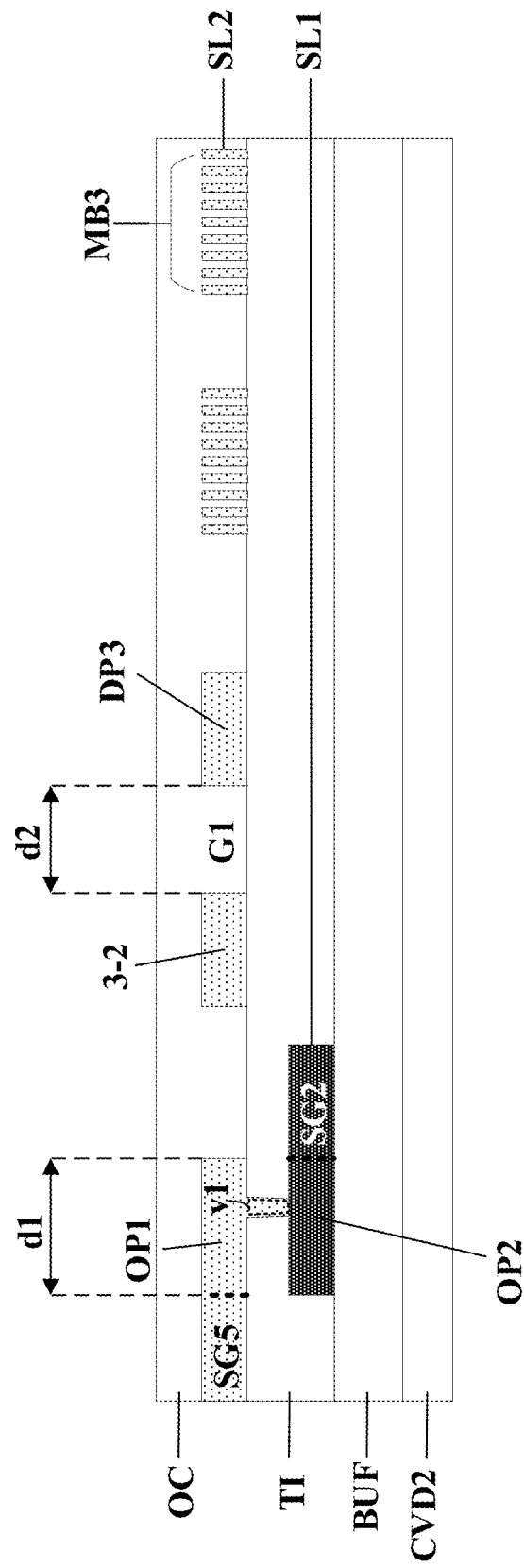
FIG. 11B is a cross-sectional view along an E-E' line in FIG. 11A.
Figure 11C:
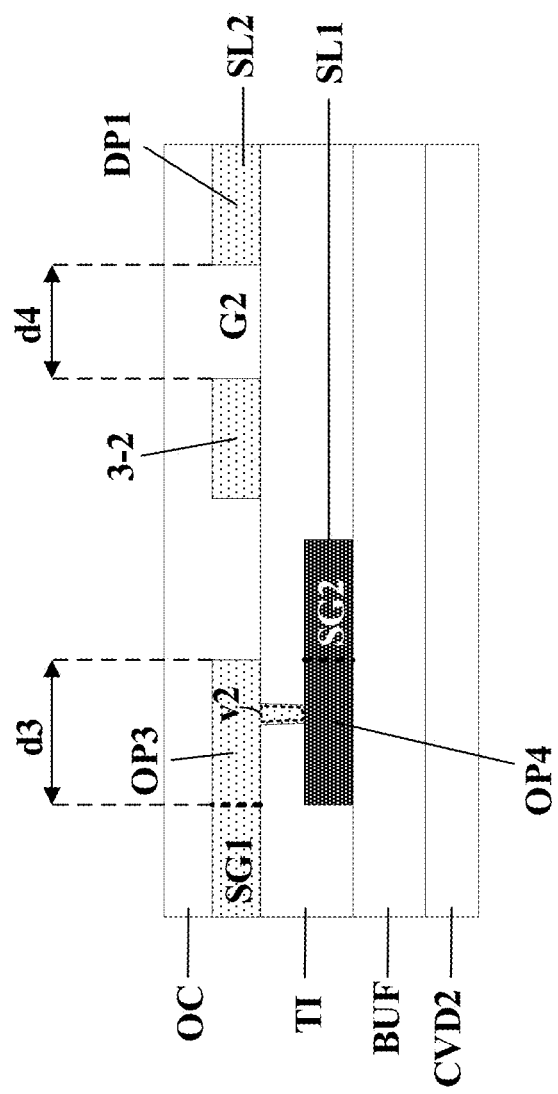
FIG. 11C is a cross-sectional view along a F-F' line in FIG. 11A.
Figure 11D:
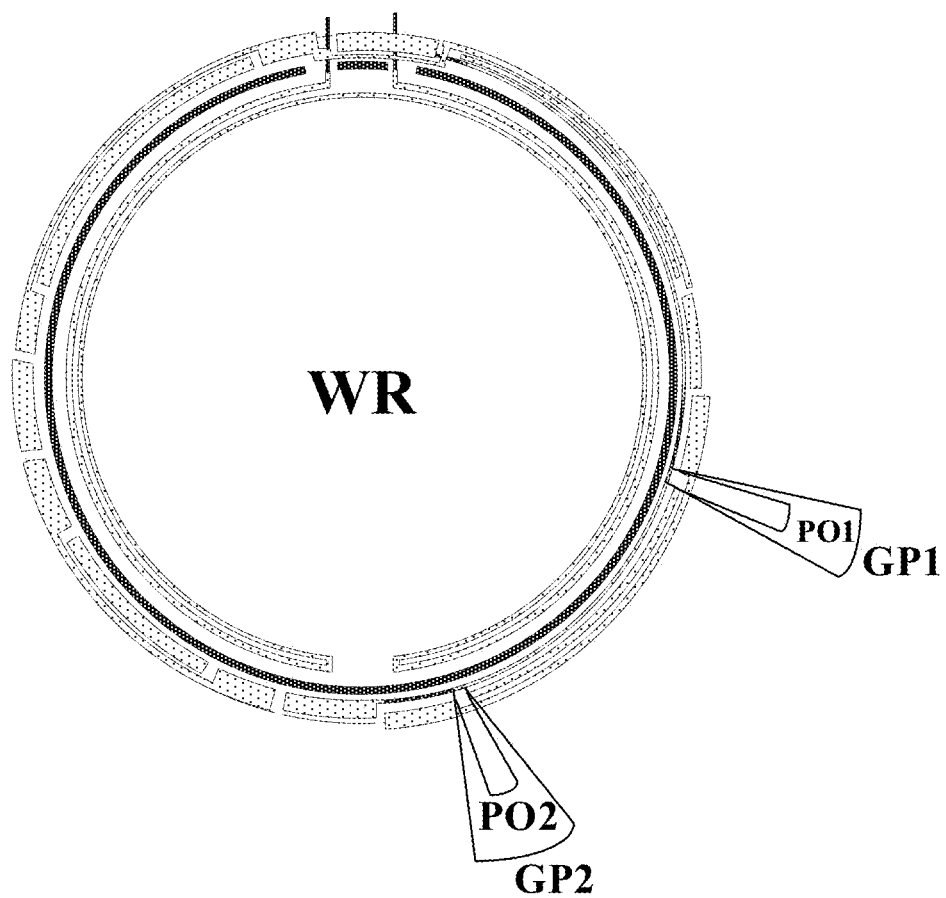
FIG. 11D is a schematic diagram illustrating a window region in some embodiments according to the present disclosure.

FIG. 11A is a zoom-in view of a first zoom-in region ZR1 in FIG. 2. FIG. 11B is a cross-sectional view along an E-E' line in FIG. 11A. FIG. 11C is a cross-sectional view along a F-F' line in FIG. 11A. FIG. 11D is a schematic diagram illustrating a window region in some embodiments according to the present disclosure. Referring to FIG. 11A to FIG. 11D, an orthographic projection of a first overlapping portion OP1 of the fifth segment SG5 on a base substrate BS at least partially overlaps with an orthographic projection of a second overlapping portion OP2 of the second segment SG2 on the base substrate BS, the first overlapping portion OP1 connecting to the second overlapping portion OP2 through a first via v1 extending through a touch insulating layer TI. The first overlapping portion OP1 and the second overlapping portion OP2 are around a first partially overlapping portion PO1 of the periphery of the window region WR. Optionally, the first partially overlapping portion PO1 is a portion wherein the tenth portion P10 and the second portion P2 partially overlap with each other. The second part 3-2 is spaced apart from a third dummy plate DP3 adjacent to the second part 3-2 by a first gap G1. The first gap G1 is around a first gap portion GP1 of the periphery of the window region WR. As shown in FIG. 11D, the first partially overlapping portion PO1 includes the first gap portion GP1, e.g., the first gap portion GP1 is at least a portion of the first partially overlapping portion PO1. Optionally, the first partially overlapping portion PO1 is the same as the first gap portion GP1.

In some embodiments, the first overlapping portion OP1 and the second overlapping portion OP2 each have a length d1 along an extension direction ED of the first conductive bridge CB1, and the first gap portion GP1 has a first gap width d2 along the extension direction ED of the first conductive bridge CB1. Optionally, d1 is greater than d2. Optionally, d1 equals to d2.

Referring to FIG. 11A to FIG. 11D, an orthographic projection of a third overlapping portion OP3 of the first segment SG1 on a base substrate BS at least partially overlaps with a fourth overlapping portion OP4 of the second segment SG2, the third overlapping portion OP3 connecting to the fourth overlapping portion OP4 through a second via v2 extending through the touch insulating layer TI. The third overlapping portion OP3 and the fourth overlapping portion OP4 are around a second partially overlapping portion PO2 of the periphery of the window region WR. Optionally, the third partially overlapping portion PO3 is a portion wherein the first portion P1 and the second portion P2 partially overlap with each other. The second part 3-2 is spaced apart from a first dummy plate DP1 adjacent to the second part 3-2 by a second gap G2. The second gap G2 is around a second gap portion GP2 of the periphery of the window region WR. As shown in FIG. 11D, the second partially overlapping portion PO2 includes the second gap portion GP2, e.g., the second gap portion GP2 is at least a portion of the second partially overlapping portion PO2. Optionally, the second partially overlapping portion PO2 is the same as the second gap portion GP2.

In some embodiments, the third overlapping portion OP3 and the fourth overlapping portion OP4 each have a length d3 along an extension direction ED of the first conductive bridge CB1, and the second gap portion GP2 has a second gap width d4 along the extension direction ED of the first conductive bridge CB1. Optionally, d3 is greater than d4. Optionally, d3 equals to d4.

In some embodiments, at least multiple conductive plates (e.g., one or more of the first conductive plate CP1, the second conductive plate CP2, the third conductive plate CP3, the fourth conductive plate CP4, the fifth conductive plate CP5) of the touch control structure are a plurality of capacitance-compensating plates. A respective one of the plurality of capacitance-compensating plates is connected to at least one mesh line of a respective one of a plurality of window-adjacent mesh blocks. In some embodiments, an occupied area of the respective one of the plurality of capacitance-compensating plates is correlated to a reduction in an occupied area of the respective one of the plurality of window-adjacent mesh blocks relative to a reference mesh block. In some embodiments, the reference mesh block is an internal mesh block electrically connected to the respective one of the plurality of window-adjacent mesh blocks, the internal mesh block spaced apart from the window region by the respective one of the plurality of window-adjacent mesh blocks. As used herein, the term "internal mesh block' refers to a mesh block that is not directly adjacent to any edge of the touch control structure, and is not directly adjacent to the window region. As used herein, the term "occupied area" refers to an area occupied by the electrode blocks or the fill patterns. In case the electrode blocks or fill patterns are mesh electrode blocks or mesh patterns, the "occupied area" refers to an area encircled by boundaries (formed by line breaks in the mesh lines) respectively of the electrode blocks and the fill patterns, excluding areas occupied by any internal fill patterns in an electrode block.

In one example, referring to FIG. 2, an occupied area of the first conductive plate CP1 is correlated to a reduction in an occupied area of the first mesh block MB1 relative to an internal mesh block electrically connected to the first mesh block MB1, the internal mesh block spaced apart from the window region WR by the first mesh block MB1. In another example, referring to FIG. 2, an occupied area of the second conductive plate CP2 is correlated to a reduction in an occupied area of the second mesh block MB2 relative to an internal mesh block electrically connected to the second mesh block MB2, the internal mesh block spaced apart from the window region WR by the second mesh block MB2. In another example, referring to FIG. 2, an occupied area of the third conductive plate CP3 is correlated to a reduction in an occupied area of the third mesh block MB3 relative to an internal mesh block electrically connected to the third mesh block MB3, the internal mesh block spaced apart from the window region WR by the third mesh block MB3. In another example, referring to FIG. 2, an occupied area of the fourth conductive plate CP4 is correlated to a reduction in an occupied area of the fourth mesh block MB4 relative to an internal mesh block electrically connected to the fourth mesh block MB4, the internal mesh block spaced apart from the window region WR by the fourth mesh block MB4. In another example, referring to FIG. 2, an occupied area of the fifth conductive plate CP5 is correlated to a reduction in an occupied area of the fifth mesh block MB5 relative to an internal mesh block electrically connected to the fifth mesh block MB5, the internal mesh block spaced apart from the window region WR by the fifth mesh block MB5.

Figure 12A:
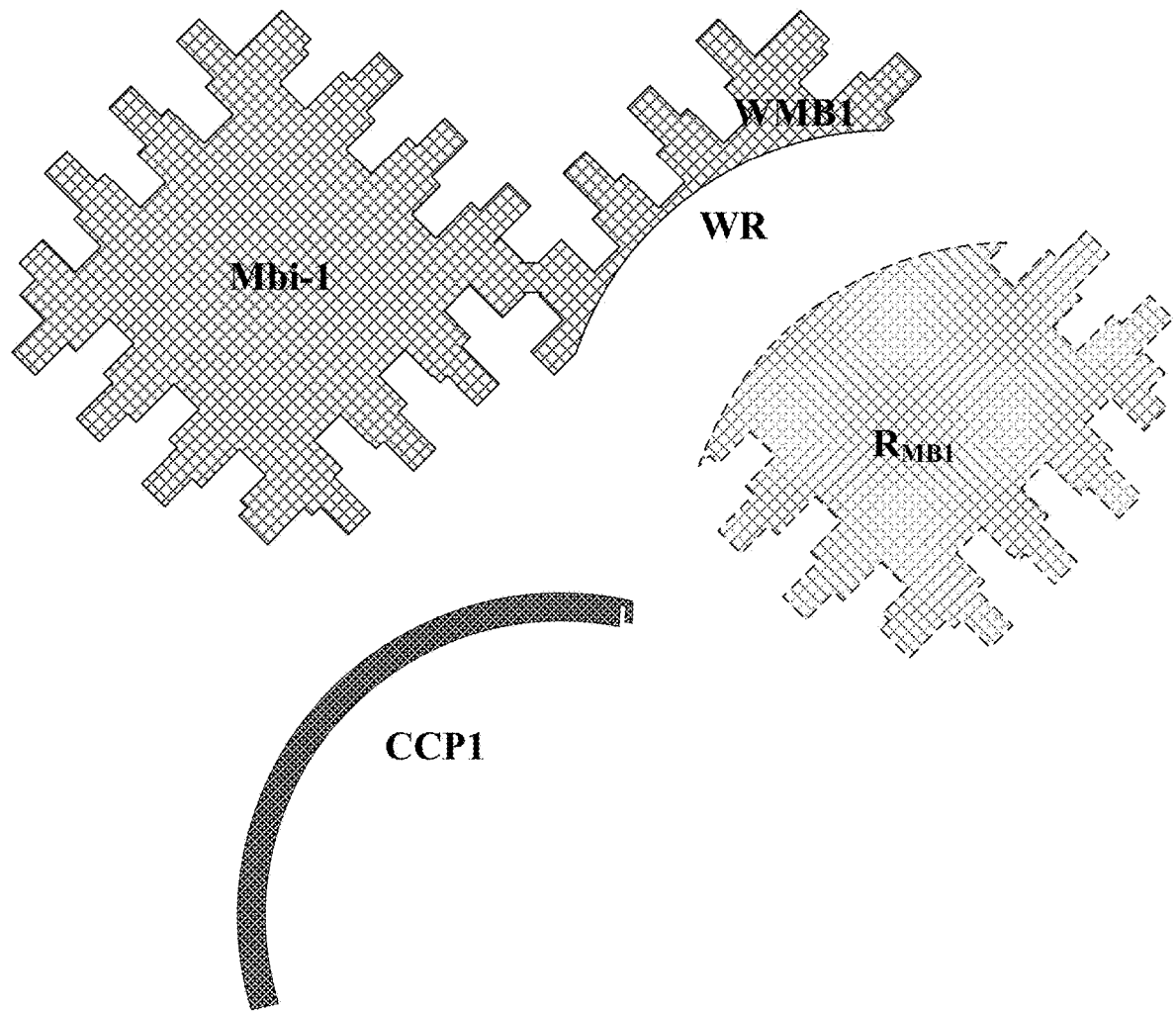
FIG. 12A illustrates a correlation between an occupied area of a first capacitance-compensating plate and a reduction in an occupied area of a first mesh block in some embodiments according to the present disclosure.
Figure 12B:
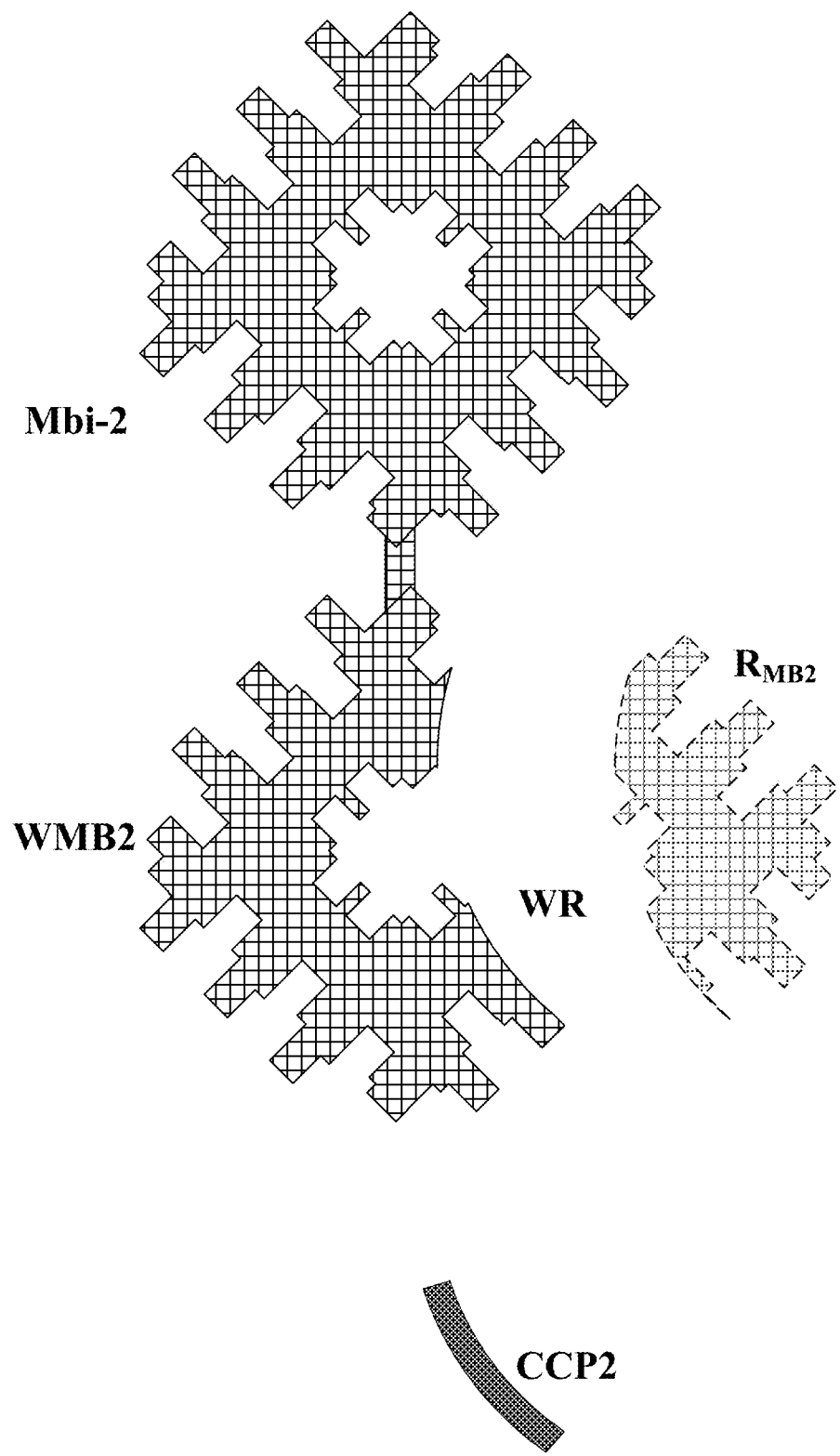
FIG. 12B illustrates a correlation between an occupied area of a second capacitance-compensating plate and a reduction in an occupied area of a second mesh block in some embodiments according to the present disclosure.
Figure 12C:
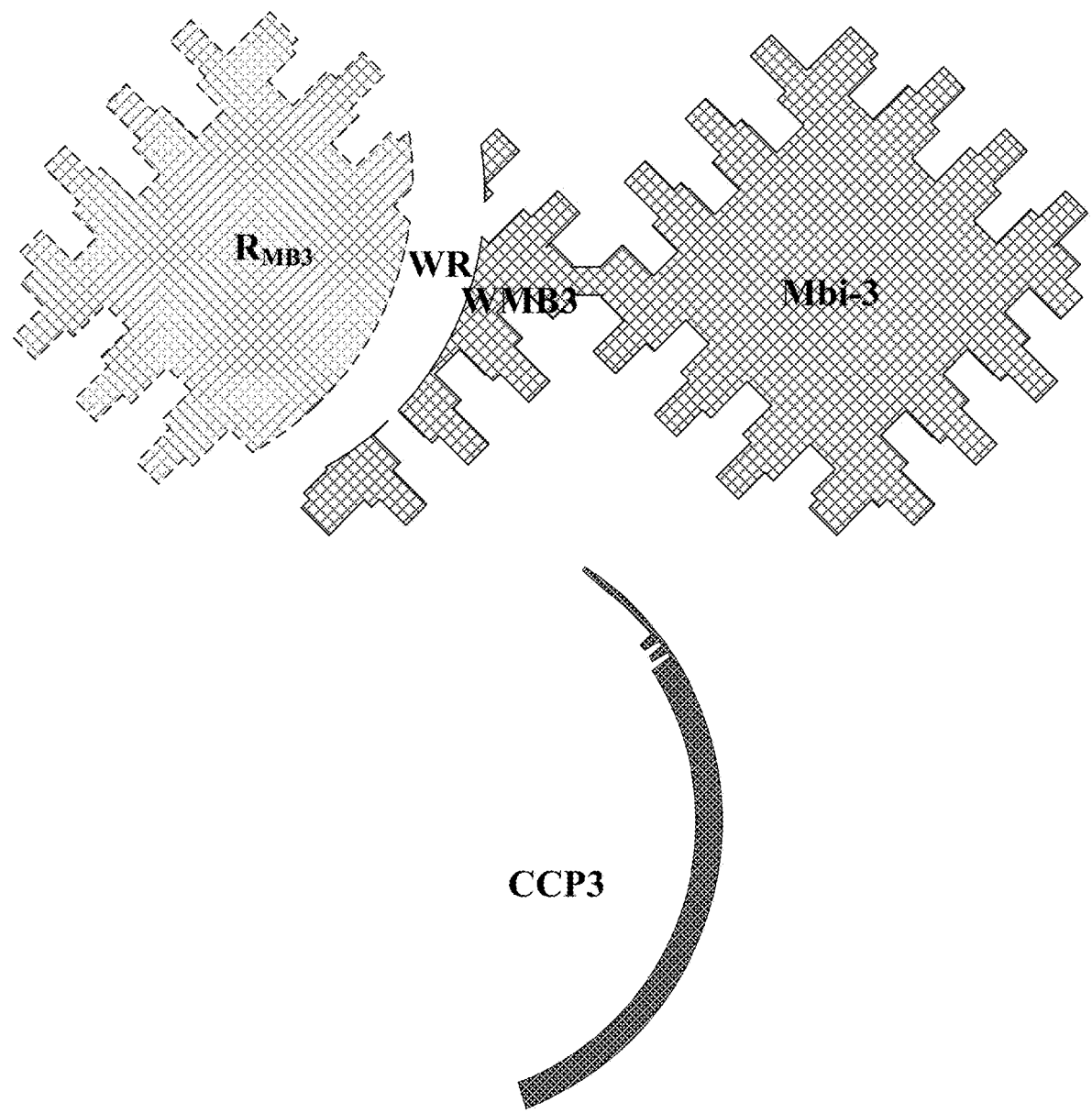
FIG. 12C illustrates a correlation between an occupied area of a third capacitance-compensating plate and a reduction in an occupied area of a third mesh block in some embodiments according to the present disclosure.
Figure 12D:
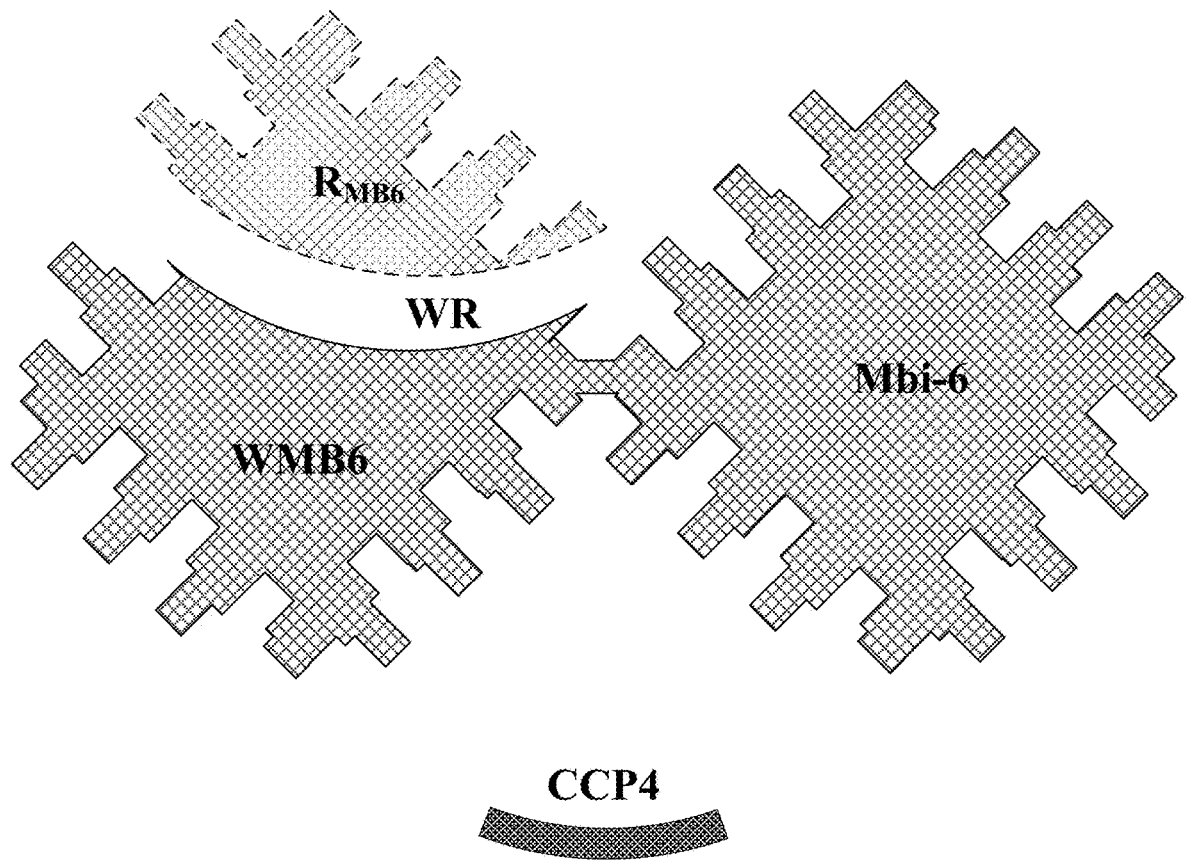
FIG. 12D illustrates a correlation between an occupied area of a fourth capacitance-compensating plate and a reduction in an occupied area of a sixth mesh block in some embodiments according to the present disclosure.

FIG. 12A illustrates a correlation between an occupied area of a first capacitance-compensating plate and a reduction in an occupied area of a first mesh block in some embodiments according to the present disclosure. Referring to FIG. 12A, a first internal mesh block Mbi-1 is electrically connected (directly or indirectly, and in a same row) to the first window mesh block WMB1, and is spaced apart from the window region WR by the first window mesh block WMB1. A first reduction in occupied area RMB1 is shown (area encircled by dotted lines), and the first capacitance-compensating conductive plate CCP1 is also shown in FIG. 12A. FIG. 12B illustrates a correlation between an occupied area of a second capacitance-compensating plate and a reduction in an occupied area of a second mesh block in some embodiments according to the present disclosure. Referring to FIG. 12B, a second internal mesh block Mbi-2 is electrically connected (directly or indirectly, and in a same column) to the second window mesh block WMB2, and is spaced apart from the window region WR by the second window mesh block WMB2. A second reduction in occupied area RMB2 is shown (area encircled by dotted lines), and the second capacitance-compensating conductive plate CCP2 is also shown in FIG. 12B. FIG. 12C illustrates a correlation between an occupied area of a third capacitance-compensating plate and a reduction in an occupied area of a third mesh block in some embodiments according to the present disclosure. Referring to FIG. 12C, a third internal mesh block Mbi-3 is electrically connected (directly or indirectly, and in a same row) to the third window mesh block WMB3, and is spaced apart from the window region WR by the third window mesh block WMB3. A third reduction in occupied area RMB3 is shown (area encircled by dotted lines), and the third capacitance-compensating conductive plate CCP3 is also shown in FIG. 12C. FIG. 12D illustrates a correlation between an occupied area of a fourth capacitance-compensating plate and a reduction in an occupied area of a sixth mesh block in some embodiments according to the present disclosure. Referring to FIG. 12D, a sixth internal mesh block Mbi-6 is electrically connected (directly or indirectly, and in a same row) to the sixth window mesh block WMB6, and is spaced apart from the window region WR by the sixth window mesh block WMB6. A sixth reduction in occupied area RMB6 is shown (area encircled by dotted lines), and the fourth capacitance-compensating conductive plate CCP4 is also shown in FIG. 12D.

As illustrated in FIG. 12A to FIG. 12D, occupied areas of the plurality of capacitance-compensating plates (e.g., the first capacitance-compensating plate CCP1, the second capacitance-compensating plate CCP2, the third capacitance-compensating plate CCP3, and the fourth capacitance-compensating plate CCP4) are correlated to reductions in occupied areas (e.g., the first reduction in occupied area RMB1, the second reduction in occupied area RMB2, the third reduction in occupied area RMB3, and the sixth reduction in occupied area RMB6) of the plurality of window-adjacent mesh blocks (e.g., the first window mesh block WMB1, the second window mesh block WMB2, the third window mesh block WMB3, and the sixth window mesh block WMB6) respectively relative to reference mesh blocks. In one example, the reference mesh blocks are internal mesh blocks (e.g., the first internal mesh block Mbi-1, the second internal mesh block Mbi-2, the third internal mesh block Mbi-3, and the sixth internal mesh block Mbi-6) respectively electrically connected to the plurality of window-adjacent mesh blocks. A respective internal mesh block is spaced apart from the window region by a respective window-adjacent mesh block.

In some embodiments, a ratio of occupied areas of respective two of the plurality of capacitance-compensating conductive plates is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of reductions in occupied areas of respective two of the plurality of window-adjacent mesh blocks respectively connected to the respective two of the plurality of capacitance-compensating conductive plates. Optionally, the ratio of occupied areas of respective two of the plurality of capacitance-compensating conductive plates is within 10% of the ratio of reductions in occupied areas of respective two of the plurality of window-adjacent mesh blocks respectively connected to the respective two of the plurality of capacitance-compensating conductive plates. The reductions in occupied areas are respectively relative to respective two internal mesh blocks respectively electrically connected to the respective two of the plurality of window-adjacent mesh blocks. The two internal mesh blocks are respectively spaced apart from the window region respectively by the respective two of the plurality of window-adjacent mesh blocks. Referring to FIG. 12A to FIG. 12D, in one example, a ratio of occupied areas of the first capacitance-compensating plate CCP1 and the second capacitance-compensating plate CCP2 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the first reduction in occupied area RMB1 and the second reduction in occupied area RMB2. In another example, a ratio of occupied areas of the first capacitance-compensating plate CCP1 and the third capacitance-compensating plate CCP3 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the first reduction in occupied area RMB1 and the third reduction in occupied area RMB3. In another example, a ratio of occupied areas of the first capacitance-compensating plate CCP1 and the fourth capacitance-compensating plate CCP4 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the first reduction in occupied area RMB1 and the sixth reduction in occupied area RMB6. In another example, a ratio of occupied areas of the second capacitance-compensating plate CCP2 and the third capacitance-compensating plate CCP3 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the second reduction in occupied area RMB2 and the third reduction in occupied area RMB3. In another example, a ratio of occupied areas of the second capacitance-compensating plate CCP2 and the fourth capacitance-compensating plate CCP4 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the second reduction in occupied area RMB2 and the sixth reduction in occupied area RMB6. In another example, a ratio of occupied areas of the third capacitance-compensating plate CCP3 and the fourth capacitance-compensating plate CCP4 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the third reduction in occupied area RMB3 and the sixth reduction in occupied area RMB6.

In some embodiments, the plurality of window-adjacent mesh blocks include one or more first type window-adjacent mesh blocks (e.g., the first window mesh block WMB1, the third window mesh block WMB3, and the sixth window mesh block WMB6) that are parts of the plurality of first mesh electrodes TE1, and one or more second type window-adjacent mesh blocks (e.g., the second window mesh block WMB2) that are parts of the plurality of second mesh electrodes TE2. The plurality of capacitance-compensating plates include one or more first type capacitance-compensating plates (e.g., the first capacitance-compensating plate CCP1, the third capacitance-compensating plate CCP3, and the fourth capacitance-compensating plate CCP4) respectively connected to the one or more first type window-adjacent mesh blocks, and one or more second type capacitance-compensating plates (e.g., the second capacitance-compensating plate CCP2) respectively connected to the one or more second type window-adjacent mesh blocks.

In some embodiments, an occupied area of the respective one of the plurality of capacitance-compensating plates is correlated to a reduction in an occupied area of the respective one of the plurality of window-adjacent mesh blocks. Optionally, the reduction in the occupied area with respect to a respective one of the one or more first type window-adjacent mesh blocks is a difference between an occupied area of the respective one of the one or more first type window-adjacent mesh blocks and an average occupied area of mesh blocks of the plurality of first mesh electrodes that are spaced apart from the window region and edges of the touch control structure. Optionally, the reduction in the occupied area with respect to a respective one of the one or more second type window-adjacent mesh blocks is a difference between an occupied area of the respective one of the one or more second type window-adjacent mesh blocks and an average occupied area of mesh blocks of the plurality of second mesh electrodes that are spaced apart from the window region and edges of the touch control structure.

In some embodiments, a ratio of occupied areas of respective two of the plurality of capacitance-compensating conductive plates is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of reductions in occupied areas of respective two of the plurality of window-adjacent mesh blocks respectively connected to the respective two of the plurality of capacitance-compensating conductive plates. Optionally, a reduction in the occupied area with respect to a respective one of the one or more first type window-adjacent mesh blocks is a difference between an occupied area of the respective one of the one or more first type window-adjacent mesh blocks and an average occupied area of mesh blocks of the plurality of first mesh electrodes that are spaced apart from the window region and edges of the touch control structure. Optionally, a reduction in the occupied area with respect to a respective one of the one or more second type window-adjacent mesh blocks is a difference between an occupied area of the respective one of the one or more second type window-adjacent mesh blocks and an average occupied area of mesh blocks of the plurality of second mesh electrodes that are spaced apart from the window region and edges of the touch control structure.

Referring to FIG. 12A, in some embodiments, an electrode area of the first capacitance-compensating conductive plate CCP1 is substantially same as an electrode area of the first reduction in occupied area RMB1. Optionally, a sum of electrode areas of the first capacitance-compensating conductive plate CCP1 and the first window mesh block WMB1 is substantially same as an electrode area of the first internal mesh block Mbi-1. As used herein, the term "substantially same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value. As used herein, the term "electrode area" refers to an actual surface area of the electrode material of the electrode blocks or the fill patterns. In case the electrode blocks or fill patterns are mesh electrode blocks or mesh patterns, the "electrode area" refers to accumulated actual surface areas of mesh lines in the electrode blocks and the fill patterns.

Referring to FIG. 12B, in some embodiments, an electrode area of the second capacitance-compensating conductive plate CCP2 is substantially same as an electrode area of the second reduction in occupied area RMB2. Optionally, a sum of electrode areas of the second capacitance-compensating conductive plate CCP2 and the second window mesh block WMB2 is substantially same as an electrode area of the second internal mesh block Mbi-2.

Referring to FIG. 12C, in some embodiments, an electrode area of the third capacitance-compensating conductive plate CCP3 is substantially same as an electrode area of the third reduction in occupied area RMB3. Optionally, a sum of electrode areas of the third capacitance-compensating conductive plate CCP3 and the third window mesh block WMB3 is substantially same as an electrode area of the third internal mesh block Mbi-3.

Referring to FIG. 12D, in some embodiments, an electrode area of the fourth capacitance-compensating conductive plate CCP4 is substantially same as an electrode area of the sixth reduction in occupied area RMB6. Optionally, a sum of electrode areas of the fourth capacitance-compensating conductive plate CCP4 and the sixth window mesh block WMB6 is substantially same as an electrode area of the sixth internal mesh block Mbi-6.

In one example, a ratio of A:B is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of C:D, wherein A and B are electrode areas or occupied areas of any two different capacitance-compensating conductive plates selected from a group consisting of the first capacitance-compensating conductive plate CCP1, the second capacitance-compensating conductive plate CCP2, the third capacitance-compensating conductive plate CCP3, and the fourth capacitance-compensating conductive plate CCP4; C and D are any two different reductions in occupied area selected from a group consisting of the first reduction in occupied area RMB1, the second reduction in occupied area RMB2, the third reduction in occupied area RMB3, the sixth reduction in occupied area RMB6.

In another aspect, the present disclosure provides a display apparatus. In some embodiments, the display apparatus includes a display panel comprising a touch control structure described herein or fabricated by a method described herein; and an integrated circuit. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

Figure 13:
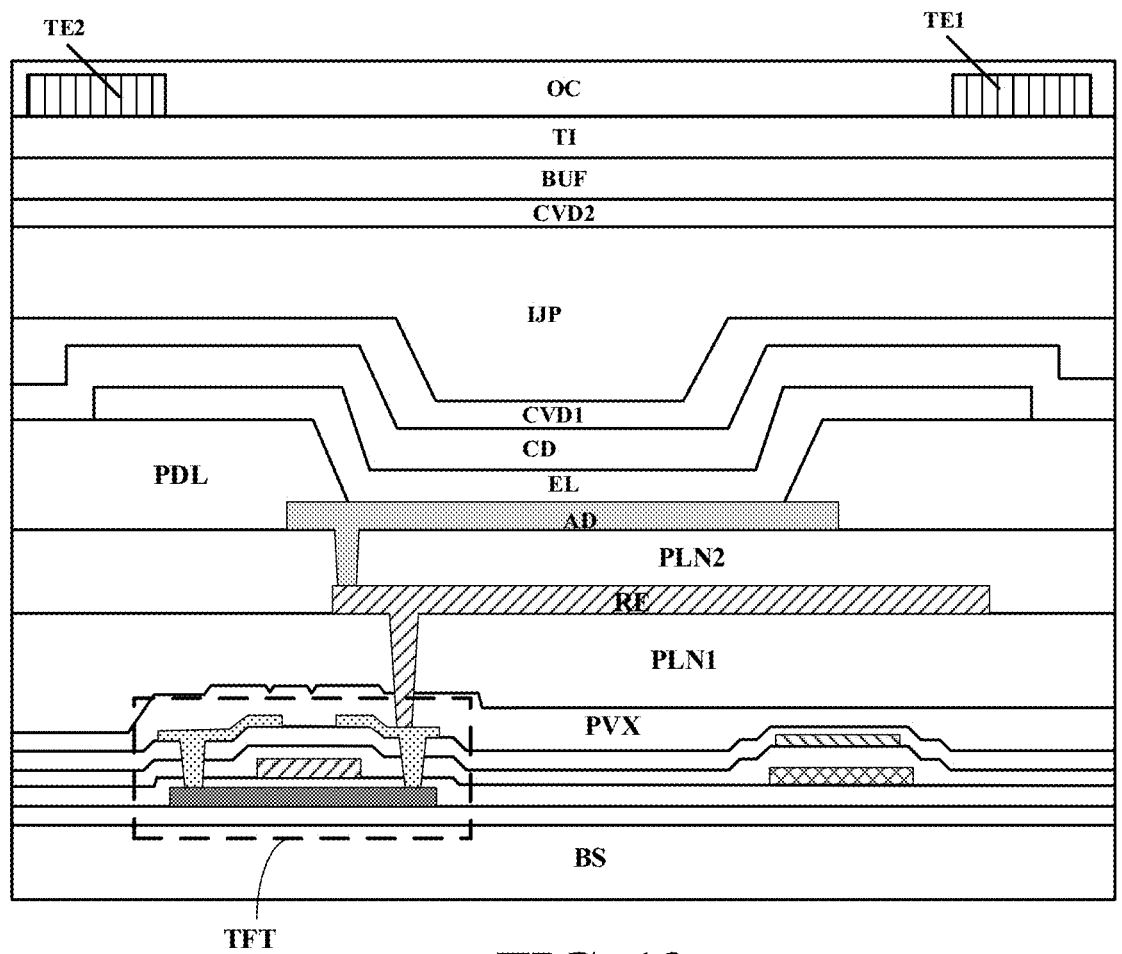
FIG. 13 is a cross sectional view of a display apparatus in some embodiments according to the present disclosure.

FIG. 13 is a cross sectional view of a display panel in some embodiments according to the present disclosure. Referring to FIG. 13, in the display region, the display panel includes a base substrate BS, a plurality of thin film transistors TFT on the base substrate BS, a passivation layer PVX on a side of the plurality of thin film transistors TFT away from the base substrate BS, a first planarization layer PLN1 on side of the passivation layer PVX away from the base substrate BS, a relay electrode RE on side of the first planarization layer PLN1 away from the passivation layer PVX, a second planarization layer PLN2 on a side of the relay electrode RE away from the first planarization layer PLN1, a pixel definition layer PDL on a side of the second planarization layer PLN2 away from the first planarization layer PLN1 and defining subpixel apertures, an anode AD on a side of the second planarization layer PLN2 away from the first planarization layer PLN1, a light emitting layer EL on a side of the anode AD away from the second planarization layer PLN2, a cathode CD on a side of the light emitting layer EL away from the anode AD, a first inorganic encapsulating layer CVD1 on a side of the cathode CD away from light emitting layer EL, an organic encapsulating layer IJP on a side of the first inorganic encapsulating layer CVD1 away from the cathode CD, a second inorganic encapsulating layer CVD2 on a side of the organic encapsulating layer IJP away from the first inorganic encapsulating layer CVD1, a buffer layer BUF on a side of the second inorganic encapsulating layer CVD2 away from the organic encapsulating layer IJP, a touch insulating layer TI on a side of the buffer layer BUF away from the second inorganic encapsulating layer CVD2, touch electrodes (e.g., the plurality of first touch electrodes TE1 and the plurality of second touch electrodes TE2 as shown in FIG. 1) on a side of the touch insulating layer TI away from the buffer layer BUF, and an overcoat layer OC on a side of the touch electrodes away from the touch insulating layer TI.

Figure 14:
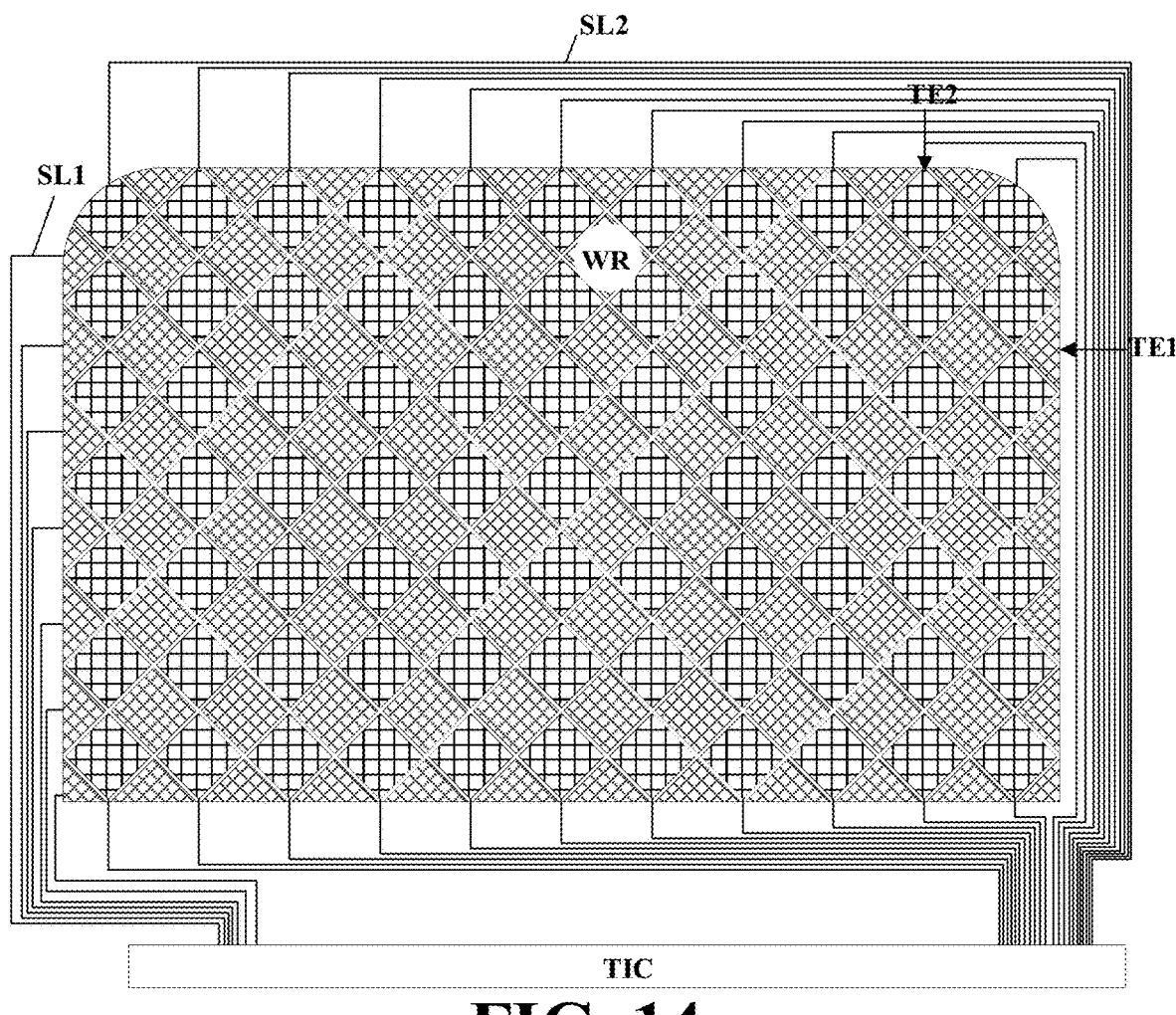
FIG. 14 is a schematic diagram illustrating the structure of a display apparatus having a touch control structure in some embodiments according to the present disclosure.

FIG. 14 is a schematic diagram illustrating the structure of a display apparatus having a touch control structure in some embodiments according to the present disclosure. In some embodiments, the touch control structure further includes a plurality of first touch signal lines SL1 respectively connected to the plurality of first mesh electrodes TE1, and a plurality of second touch signal lines SL2 respectively connected to the plurality of second mesh electrodes TE2. The display apparatus further includes a touch control driving integrated circuit TIC. The plurality of first touch signal lines SL1 and the plurality of second touch signal lines SL2 are connected to the touch control driving integrated circuit TIC.

In another aspect, the present disclosure provides a method of fabricating a touch control structure. In some embodiments, the method includes forming a plurality of first mesh electrodes along a row direction and forming a plurality of second mesh electrodes along a column direction. Optionally, the touch control structure is formed to be limited in a touch control region and absent in a window region surrounded by the touch control region. Optionally, forming a window-crossing column of the plurality of second mesh electrodes includes forming a first mesh block and a second mesh block respectively on a first side and a second side of the window region; forming a first conductive plate directly connected to one or more mesh lines of the first mesh block; forming a second conductive plate directly connected to one or more mesh lines of the second mesh block; and forming a first conductive bridge connecting the first conductive plate and the second conductive plate. Optionally, forming the first conductive bridge includes forming a first segment and forming a second segment. Optionally, the second segment is formed in a layer different from the first segment, the first conductive plate, and the second conductive plate.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element.

Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel, comprising:
a plurality of light emitting elements;
an encapsulating layer on the plurality of light emitting elements; and
a touch control structure on the encapsulating layer;
wherein the touch control structure comprises a plurality of first mesh electrodes along a row direction and a plurality of second mesh electrodes along a column direction;
wherein the touch control structure is limited in a touch control region and absent in a window region surrounded by the touch control region;
wherein the plurality of second mesh electrodes comprises:
a first mesh block and a second mesh block respectively on a first side and a second side of the window region; and
a first conductive bridge connecting the first mesh block and the second mesh block;
wherein the first conductive bridge comprises a first segment and a second segment; and
the second segment is in a layer different from the first segment;
wherein the window region is a region in the display panel having a hole configured for installing an accessory; and
the plurality of light emitting elements are absent in a window region.

2. The display panel of claim 1, wherein the plurality of second mesh electrodes further comprises:
a first conductive plate connected to one or more mesh lines of the first mesh block; and
a second conductive plate connected to one or more mesh lines of the second mesh block;
wherein the first conductive bridge connects the first conductive plate and the second conductive plate; and
the second segment is in a layer different from the first conductive plate and the second conductive plate.

3. The display panel of claim 1, wherein the plurality of first mesh electrodes comprises:
a third mesh block on a third side of the window region; and
a third conductive plate connected to one or more mesh lines of the third mesh block;
wherein the third conductive plate spaces apart the first conductive bridge from the third mesh block;
the third conductive plate comprises a first part and a second part;
the second segment is in a layer different from the third conductive plate;
the first segment and the second segment are respectively around a first portion and a second portion of a periphery of the window region;
the first part and the second part are respectively around a third portion and a fourth portion of the periphery of the window region;
the first portion is at least partially overlapping with the third portion; and
the second portion is at least partially overlapping with the fourth portion.

4. The display panel of claim 3, wherein the first part has a first shortest plate width along a direction from the first part to the window region;
the second part has a second shortest plate width along a direction from the second part to the window region; and
the first shortest plate width is less than the second shortest plate width.

5. The display panel of claim 3, wherein the plurality of second mesh electrodes further comprises:
a first conductive plate connected to one or more mesh lines of the first mesh block; and
a second conductive plate connected to one or more mesh lines of the second mesh block;
wherein the first conductive bridge further comprises a fifth segment in a same layer as the first segment, the first conductive plate, and the second conductive plate;
wherein an orthographic projection of a first overlapping portion of the fifth segment on a base substrate at least partially overlaps with an orthographic projection of a second overlapping portion of the second segment on the base substrate, the first overlapping portion connecting to the second overlapping portion through a via extending through a touch insulating layer;
the first overlapping portion and the second overlapping portion are around a partially overlapping portion of the periphery of the window region;
the second part is spaced apart from a third dummy plate adjacent to the second part by a gap around a gap portion of the periphery of the window region; and
the partially overlapping portion comprises the gap portion.

6. The display panel of claim 3, wherein the third conductive plate further comprises a third part, the first part between the second part and the third part;
wherein the plurality of second mesh electrodes further comprises:
a first conductive plate connected to one or more mesh lines of the first mesh block; and
a second conductive plate connected to one or more mesh lines of the second mesh block;
wherein the first conductive bridge further comprises a third segment, the first segment between the second segment and the third segment;
wherein the third segment is in a same layer as the second segment, and is in a layer different from the first segment, the first conductive plate, the second conductive plate, and the third conductive plate;
the third segment is around a fifth portion of the periphery of the window region;
the third part is around a sixth portion of the periphery of the window region; and
the fifth portion is at least partially overlapping with the sixth portion.

7. The display panel of claim 6, wherein the first part has a first shortest plate width along a direction from the first part to the window region;
the second part has a second shortest plate width along a direction from the second part to the window region;

the third part has a third shortest plate width along a direction from the third part to the window region; and
the first shortest plate width is less than the second shortest plate width, and is less than the third shortest plate width.

8. The display panel of claim 7, further comprising a first dummy plate insulated from the first conductive bridge and the third conductive plate, and spacing part a portion of the first conductive bridge and a portion of the third conductive plate;
the first dummy plate is around a seventh portion of the periphery of the window region; and
the seventh portion is at least partially overlapping with the third portion, and is non-overlapping with the fourth portion and the sixth portion.

9. The display panel of claim 3, wherein, in an orthographic projection of the touch control structure on a base substrate, an orthographic projection of a conductive component on the base substrate is absent in a space between an orthographic projection of the second segment on the base substrate and an orthographic projection of the second part on the base substrate.

10. The display panel of claim 6, wherein, in an orthographic projection of the touch control structure on a base substrate, an orthographic projection of a conductive component on the base substrate is absent in a space between an orthographic projection of the second segment on the base substrate and an orthographic projection of the second part on the base substrate; and
in the orthographic projection of the touch control structure on the base substrate, an orthographic projection of a conductive component on the base substrate is absent in a space between an orthographic projection of the third segment on the base substrate and an orthographic projection of the third part on the base substrate.

11. The display panel of claim 8, wherein, in an orthographic projection of the touch control structure on a base substrate, an orthographic projection of a conductive component on the base substrate is absent in a space between an orthographic projection of the second segment on the base substrate and an orthographic projection of the second part on the base substrate;
in the orthographic projection of the touch control structure on the base substrate, an orthographic projection of a conductive component on the base substrate is absent in a space between an orthographic projection of the third segment on the base substrate and an orthographic projection of the third part on the base substrate; and
in the orthographic projection of the touch control structure on the base substrate, an orthographic projection of the first dummy plate on the base substrate is in a space between an orthographic projection of the first segment on the base substrate and an orthographic projection of the first part on the base substrate.

12. The display panel of claim 1, wherein the plurality of first mesh electrodes comprises:
a fourth mesh block and a fifth mesh block respectively on a fourth side and a fifth side of the window region;
a fourth conductive plate connected to one or more mesh lines of the fourth mesh block;
a fifth conductive plate connected to one or more mesh lines of the fifth mesh block; and
a second conductive bridge connecting the fourth conductive plate and the fifth conductive plate;
wherein the plurality of second mesh electrodes further comprises:
a first conductive plate connected to one or more mesh lines of the first mesh block; and
a second conductive plate connected to one or more mesh lines of the second mesh block;
wherein the first conductive plate is around an eighth portion of a periphery of the window region;
the second conductive bridge is around a ninth portion of the periphery of the window region; and
the eighth portion is at least partially overlapping with the ninth portion.

13. The display panel of claim 12, wherein the first conductive bridge further comprises a fourth segment crossing over a portion of the second conductive bridge to connect with the first conductive plate; and
the fourth segment is in a same layer as the second segment, and is in a layer different from the first segment, the first conductive plate, the second conductive plate, the fourth conductive plate, the fifth conductive plate, and the second conductive bridge.

14. The display panel of claim 13, wherein the first conductive bridge further comprises a fifth segment between the fourth segment and the second segment; and
wherein the fifth segment is in a same layer as the first segment, and is in a layer different from the second segment and the fourth segment.

15. The display panel of claim 14, further comprising a second dummy plate insulated from the fifth conductive plate and the fifth segment, and spacing part a portion of the fifth conductive plate and a portion of the fifth segment;
wherein the fifth segment is around a tenth portion of a periphery of the window region;
the second dummy plate is around an eleventh portion of the periphery of the window region; and
the tenth portion is at least partially overlapping with the eleventh portion.

16. The display panel of claim 15, further comprising a third dummy plate around a twelfth portion of the periphery of the window region;
wherein the second segment is around a second portion of the periphery of the window region;
the twelfth portion is between the eleventh portion and the second portion; and
the twelfth portion is non-overlapping with the eleventh portion, and is non-overlapping with the second portion.

17. The display panel of claim 1, further comprising a detection line substantially surrounding the window region;
wherein the detection line comprises contiguously a first line portion extending counter-clock-wisely around a first half of a periphery of the window region, a second line portion extending clock-wisely around the first half of the periphery of the window region and a second half of the periphery of the window region, and a third line portion extending counter-clock-wisely around the second half of the periphery of the window region.

18. The display panel of claim 17, further comprising:
a sixth mesh block and a seventh mesh block respectively on two sides of the first mesh block;
a first lead line connecting the sixth mesh block to the first line portion; and
a second lead line connecting the seventh mesh block to the third line portion.

19. The display panel of claim 1, wherein the encapsulating layer comprises a first inorganic encapsulating layer, an organic encapsulating layer on a side of the first inorganic encapsulating layer away from the plurality of light emitting elements, a second inorganic encapsulating layer on a side of the organic encapsulating layer away from the first inorganic encapsulating layer;
wherein the display panel further comprises:
a buffer layer on a side of the second inorganic encapsulating layer away from the organic encapsulating layer; and
a touch insulating layer on a side of the buffer layer away from the second inorganic encapsulating layer;
wherein the touch insulating layer spaces apart the first segment and the second segment from each other.

20. A display apparatus, comprising:
the display panel of claim 1;
an integrated circuit connected to the display panel; and
a camera in the window region.